United States Patent
Mickens et al.

(10) Patent No.: US 10,740,195 B2
(45) Date of Patent: Aug. 11, 2020

(54) BLOCK STORAGE BY DECOUPLING ORDERING FROM DURABILITY

(71) Applicant: Microsoft Technology Licensing, LLC, Redmond, WA (US)

(72) Inventors: James W. Mickens, Bellevue, WA (US); Amar Phanishayee, Seattle, WA (US); Vijaychidambaram Velayudhan Pillai, Madison, WI (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 140 days.

(21) Appl. No.: 16/141,269

(22) Filed: Sep. 25, 2018

(65) Prior Publication Data

US 2019/0087287 A1 Mar. 21, 2019

Related U.S. Application Data

(60) Continuation of application No. 15/298,091, filed on Oct. 19, 2016, now Pat. No. 10,114,709, which is a division of application No. 14/229,355, filed on Mar. 28, 2014, now Pat. No. 9,798,631.

(60) Provisional application No. 61/935,782, filed on Feb. 4, 2014.

(51) Int. Cl.
G06F 12/00 (2006.01)
G06F 11/14 (2006.01)
G06F 3/06 (2006.01)

(52) U.S. Cl.
CPC .......... *G06F 11/1471* (2013.01); *G06F 3/061* (2013.01); *G06F 3/0619* (2013.01); *G06F 3/0647* (2013.01); *G06F 3/0656* (2013.01); *G06F 3/0659* (2013.01); *G06F 3/0683* (2013.01); *G06F 3/0689* (2013.01); *G06F 11/14* (2013.01); *G06F 11/1469* (2013.01); *G06F 2201/805* (2013.01); *G06F 2201/82* (2013.01); *G06F 2201/84* (2013.01)

(58) Field of Classification Search
CPC .... G06F 11/1471; G06F 3/061; G06F 3/0619; G06F 2/0647; G06F 3/0659
See application file for complete search history.

*Primary Examiner* — Gurtej Bansal
(74) *Attorney, Agent, or Firm* — Rainier Patents, P.S.

(57) ABSTRACT

This document relates to data storage techniques. One example can buffer write commands and cause the write commands to be committed to storage in flush epoch order. Another example can maintain a persistent log of write commands that are arranged in the persistent log in flush epoch order. Both examples may provide a prefix consistent state in the event of a crash.

20 Claims, 19 Drawing Sheets

BLOCK STORAGE BY DECOUPLING ORDERING FROM DURABILITY

BACKGROUND

Datacenter-scale storage systems have generally been developed and refined to work with "big data" applications, e.g., web search applications, genomic databases, or other massively data-intensive applications. These big data applications tend to issue very large, sequential input/output (I/O) operations to storage, e.g., on the order of 16 megabytes per I/O. Furthermore, big data applications tend to be relatively tolerant to data loss and data inconsistency. As a consequence, cloud storage techniques tend to be efficient at handling large sequential I/O operations at the cost of accepting some data loss and inconsistent state upon recovery from a crash.

On the other hand, traditional desktop/laptop applications such as Windows® or Unix® applications tend to issue relatively smaller I/O's, e.g., on the order of a few kilobytes and often to random physical storage locations. Furthermore, these traditional applications are often less tolerant of data loss and rely on stronger consistency guarantees in the event of a crash. To protect against data loss and ensure data consistency, these applications often need to flush their data from memory to storage in a specific order; this order guarantees that, in the event of a crash, the application can recover its persistent storage to a consistent state. Applications can flush data either by explicit application flush calls, or via a file system (e.g., new technology file system or "NTFS") that flushes the writes on behalf of the application.

Generally, data flushes are performed synchronously, i.e., the application must wait until the data is explicitly flushed to storage before continuing with processing. In other words, the application blocks (waits) until a given data flush is complete. When a traditional application is deployed in an environment with high-performance storage resources (e.g., to the cloud), the expectation is often that the application will exhibit substantial improvements in performance. However, synchronous data flushes can significantly impede the ability of an application to leverage high-performance storage resources in parallel; in turn, this reduces application performance.

SUMMARY

The description relates to data storage. One example technique is performed by a computing device, and can include receiving multiple logical write commands comprising write data for writing to one or more physical storage devices. The technique can also include receiving a flush command to flush the write data to the one or more physical storage devices, and the multiple write commands can be within a flush epoch defined by the flush command. The technique can also include acknowledging the flush command and issuing corresponding device write commands to send the write data to the one or more physical storage devices. Some of the corresponding device write commands can be issued after the flush command is acknowledged.

An example system includes one or more physical storage devices, one or more hardware processing resources, and computer-readable instructions that, when executed by the hardware processing resources, cause the hardware processing resources to receive multiple logical write commands having corresponding write data. The computer-readable instructions can also cause the hardware processing resources to receive multiple flush commands defining corresponding flush epochs and issue the write data to a persistent log on the one or more physical storage devices via corresponding device write commands. The write data can be arranged on the persistent log in flush epoch order.

Another example technique is performed by a computing device, and can include, upon restarting after a crash, accessing a persistent log of write data. The write data can be arranged in the persistent log in flush epoch order. The example technique can also include rolling forward through the persistent log while inspecting consistency data in the persistent log until the consistency data indicates that at least one consistency criteria cannot be met.

The above listed examples are intended to provide a quick reference to aid the reader and are not intended to define the scope of the concepts described herein.

BRIEF DESCRIPTION OF THE DRAWINGS

The Detailed Description is described with reference to the accompanying figures. In the figures, the left-most digit(s) of a reference number identifies the figure in which the reference number first appears. The use of similar reference numbers in different instances in the description and the figures may indicate similar or identical items.

DETAILED DESCRIPTION

Overview

As noted above, one mechanism used to protect against data loss in a traditional application scenario is a synchronous data flush, which is a blocking call by an application (or underlying file system) that commits all outstanding data writes to storage before returning to the application. Generally, synchronous data flushes provide applications with two distinct qualities—durability and ordering. Durability implies that any flushed data writes have been committed to storage before the flush returns to the application. Ordering implies that the flushed data writes are stored in an order defined by the flushes, e.g., all writes requested by the application before a flush are committed before any subsequent writes by the application. Generally, controlling the order in which data is written to storage can ensure different types of data consistency. As noted above, some applications may be particularly reliant on consistency guarantees in the event of a crash.

One type of consistency is prefix consistency. In prefix consistency, the write stream is divided into flush epochs, such that a given flush epoch contains all writes that were issued between two flush requests. A storage system can be said to provide prefix consistency under certain circumstances. For example, a storage system can be said to provide prefix consistency if, after a crash: all writes from flush epochs 1 through N are durable; some, all, or none of the writes from epoch N+1 are durable; and no writes from epochs N+2, N+3, . . . are durable.

Synchronous flush commands provide prefix consistency by enforcing both a consistent ordering of data writes to storage and the synchronous durability of the written data. Viewed from one perspective, some disclosed implementations decouple ordering from durability by allowing flush calls to return without synchronously committing data to storage, while eventually writing the data in a manner that ensures prefix consistency. This approach allows applications or file systems that make explicit flush calls to continue without blocking. In cloud implementations, this can mean that application and/or operating system code can be deployed to the cloud and more efficiently leverage storage resources provided by cloud resources. In particular, the application and/or operating system code can more effectively use multiple storage devices because more writes can be performed in parallel instead of blocking while waiting for flush calls to return.

Example Architecture

Figure 1:
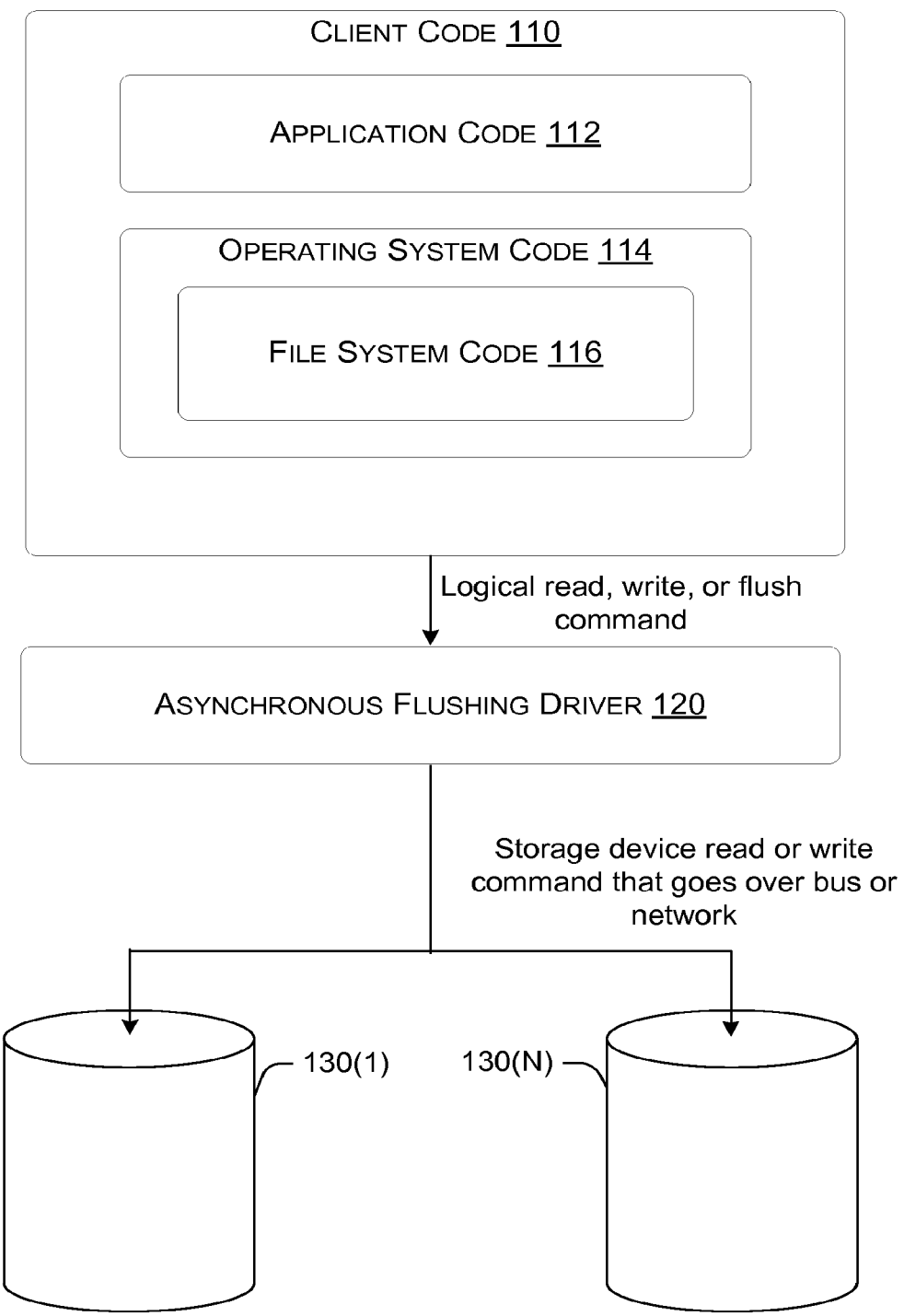
FIG. 1 illustrates an example architecture consistent with some implementations of the present concepts.

FIG. 1 shows an architecture 100 in which the disclosed implementations can be employed. In this case, the architecture 100 includes client code 110, an asynchronous flushing driver 120, and physical storage resources 130(1)-130(N) (e.g., hard drives, flash drives, etc.). Generally, the client code 110 can include an application 112 and an operating system 114, which in turn can include a file system 116. For example, the application 112 and the operating system 114 can execute in a virtual machine provided by a cloud computing service.

Generally, the client code 110 can issue logical read and write commands to a file. The file system 116 can in turn provide these logical reads and writes to the asynchronous flushing driver 120, which implements these logical commands via corresponding storage device commands that are sent over a network to physical storage devices (e.g., SAN) or bus (e.g., SCSI, SATA, etc.). The file system 116 may periodically issue flush commands to the asynchronous flushing driver 120. Note that the application 112 may also explicitly issue its own flush commands instead of relying on the file system 116 to ensure data persistence and/or ordering.

For the purposes of this document, a "logical write command," "logical read command," or "flush" can be implemented via software instructions communicated from the client code 110 (e.g., application 112 or file system 116) to the asynchronous flushing driver 120, e.g., using a shared memory. A "device write command" is a command issued by the asynchronous flushing driver 120 to any of the corresponding physical storage resources 130 (e.g., a physical storage disk) instructing the physical storage device to persist write data thereon. A "device read command" is similar to a device write command but retrieves data persisted on the physical storage device. Device write commands and device read commands may be communicated over a bus (e.g., to local storage device) or a network (e.g., to remote or local network storage).

This terminology is adopted for clarity, particularly to distinguish between the logical write commands received by the asynchronous flushing driver 120 and the device write command sent from the asynchronous flushing driver 120 to the physical storage resources 130. In cases where the distinction is less pertinent, the term "write" or "write command" will be used generally to encompass both logical write commands and corresponding device write commands. In addition, the term "write data" will be explicitly used in some cases to refer to the data being written, although write data is implicitly discussed throughout each time a logical write command or device write command is mentioned herein. Analogous terminology will be used for reads, e.g., logical read commands received from the client code 110 can be translated into corresponding device read commands that read data from physical storage resources 130.

In some implementations, the asynchronous flushing driver 120 can acknowledge flush commands received from the file system 116 or directly from the application 112 before the flushed write data is committed to the physical storage resources 130. This can allow the application 112 to stop blocking after the flush call while pending write data is still waiting to be committed to the physical storage resources 130. As discussed more below, in one example technique ("buffering scheme") the asynchronous flushing driver can buffer write data and immediately allow flush calls to return and asynchronously issue device writes in a way that satisfies prefix consistency. In another example technique ("logging scheme") the asynchronous flushing driver can immediately allow flush calls to return, and, upon receiving a logical write, it can issue the corresponding device write immediately. Both example techniques can ensure that the write data is persisted in a manner that ensures prefix consistency. This, in turn, can mean that the application 112 can adequately recover from a crash that prevented the client from issuing some or all of the buffered writes to physical storage resources.

Note that the asynchronous flushing driver 120 generally issues two types of physical storage commands to the physical storage resources 130—device reads and device writes (e.g., disk writes/reads to magnetic storage disks, solid state storage device writes/reads to solid state storage, etc.). For example, as discussed below with respect to FIGS. 3-5, the asynchronous flush driver 120 may buffer a series of logical writes intermingled with various flush calls and wait to send the write data to storage until a later time. Alternatively, as discussed below with respect to FIGS. 6-18, the asynchronous flushing driver 120 may issue the write data to the physical storage resources 130 upon receipt from the client code 110 and allow the write data to be committed out of write order, but in a manner that allows recovery to a state with a consistent prefix (e.g., in "flush epoch" order as discussed more below).

As noted above, the asynchronous flushing driver 120 may, in some cases, receive the logical read commands, logical write commands, and flush commands via a shared memory, e.g., the asynchronous flushing driver 120 may be implemented on a local machine with the client code 110. The asynchronous flushing driver 120 may then identify corresponding physical storage locations on the physical storage resources 130 and write the data to the physical storage locations. The asynchronous flushing driver 120 may also maintain mappings between virtual storage locations and physical storage locations, as discussed more below.

Example Interface

Figure 2:
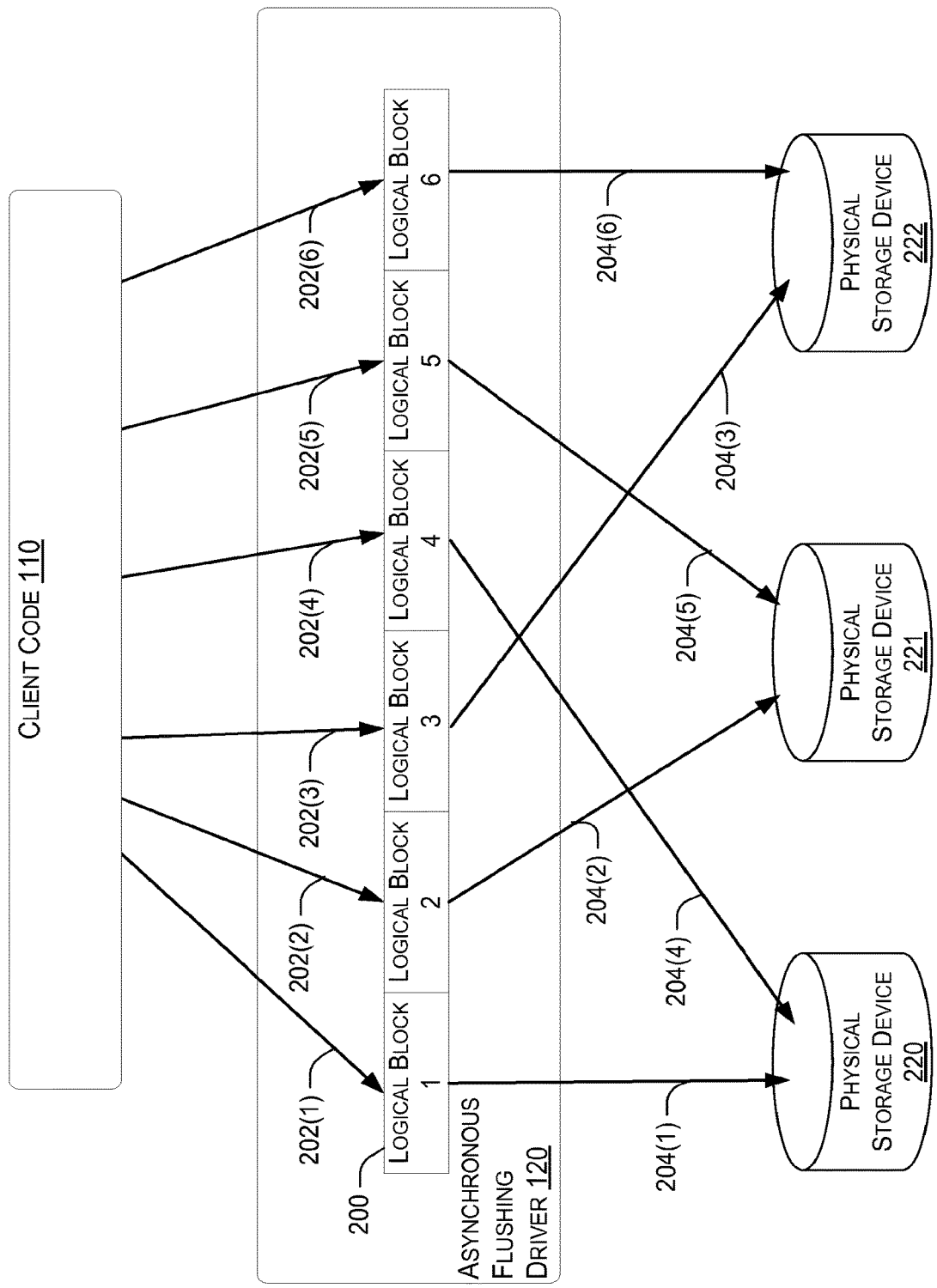
FIG. 2 illustrates an example storage scheme consistent with some implementations of the present concepts.

In some implementations, the asynchronous flushing driver 120 may present an abstraction of a virtual storage device to client code 110, e.g., the application 112, operating system 114, file system 116, etc. For example, the virtual storage device may be a virtual disk with multiple underlying physical disks that actually store the data. FIG. 2 illustrates exemplary mappings of a virtual storage device 200 to physical storage devices 220, 221, and 222 as may be performed by the asynchronous flushing driver 120. Physical storage devices 220, 221, and 222 are examples of physical storage resources 130 discussed above with respect to FIG. 1.

From the perspective of the client code 110, the virtual storage device 200 is essentially an array of bytes (e.g., perhaps in block sizes of 64 kilobytes) that can be written and read as need be, e.g., for file I/O operations such as changing the contents of a file or reading the contents of a file. For example, to change the contents of a file, the client code 110 may issue various logical write commands 202(1)-202(6) to the asynchronous flushing driver 120. The asynchronous flushing driver 120 may then, in turn, issue corresponding device write commands 204(1)-204(6) to the physical storage devices 220, 221, and 222. From the perspective of the client code 110, the physical storage locations may be irrelevant and the underlying storage implementations can be abstracted by the asynchronous flushing driver 120. In one exemplary mapping, write data stored at logical blocks 1 and 4 is stored on different physical blocks of physical storage device 220, write data stored at logical blocks 2 and 5 is stored on different physical blocks of physical storage device 221, and write data stored at logical blocks 3 and 6 is stored on different physical blocks of physical storage device 222. Viewed from one perspective, physical blocks 1-6 can be considered a single persistent log distributed across multiple physical storage devices, as discussed more below.

Thus, considering logical write commands 202(1) and 202(4), the asynchronous flushing driver 120 can implement these logical write commands by sending corresponding device write commands 204(1) and 204(4) to physical storage device 220 over a bus/network. Likewise, considering logical write commands 202(2) and 202(5), the asynchronous flushing driver 120 can implement these logical write commands by sending corresponding device write commands 204(2) and 204(5) to physical storage device 221. Similarly, logical write commands 202(3) and 202(6) can be implemented by sending device write commands 204(3) and 204(6) to physical storage device 222.

Buffering Scheme

Figure 3:
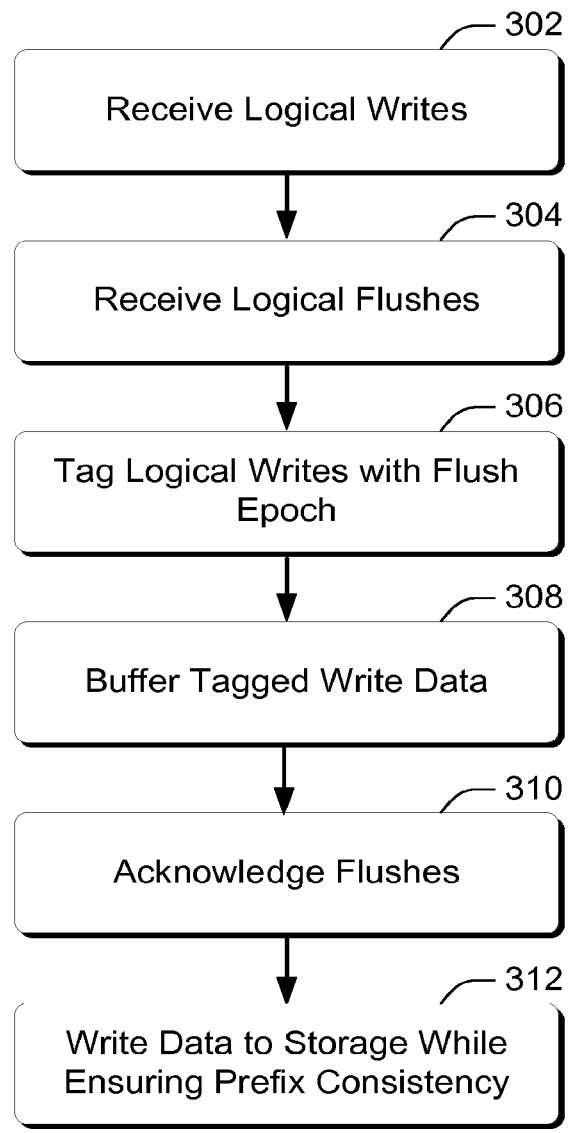
FIGS. 3, 6, and 17 illustrate example techniques consistent with some implementations of the present concepts.
Figure 4:
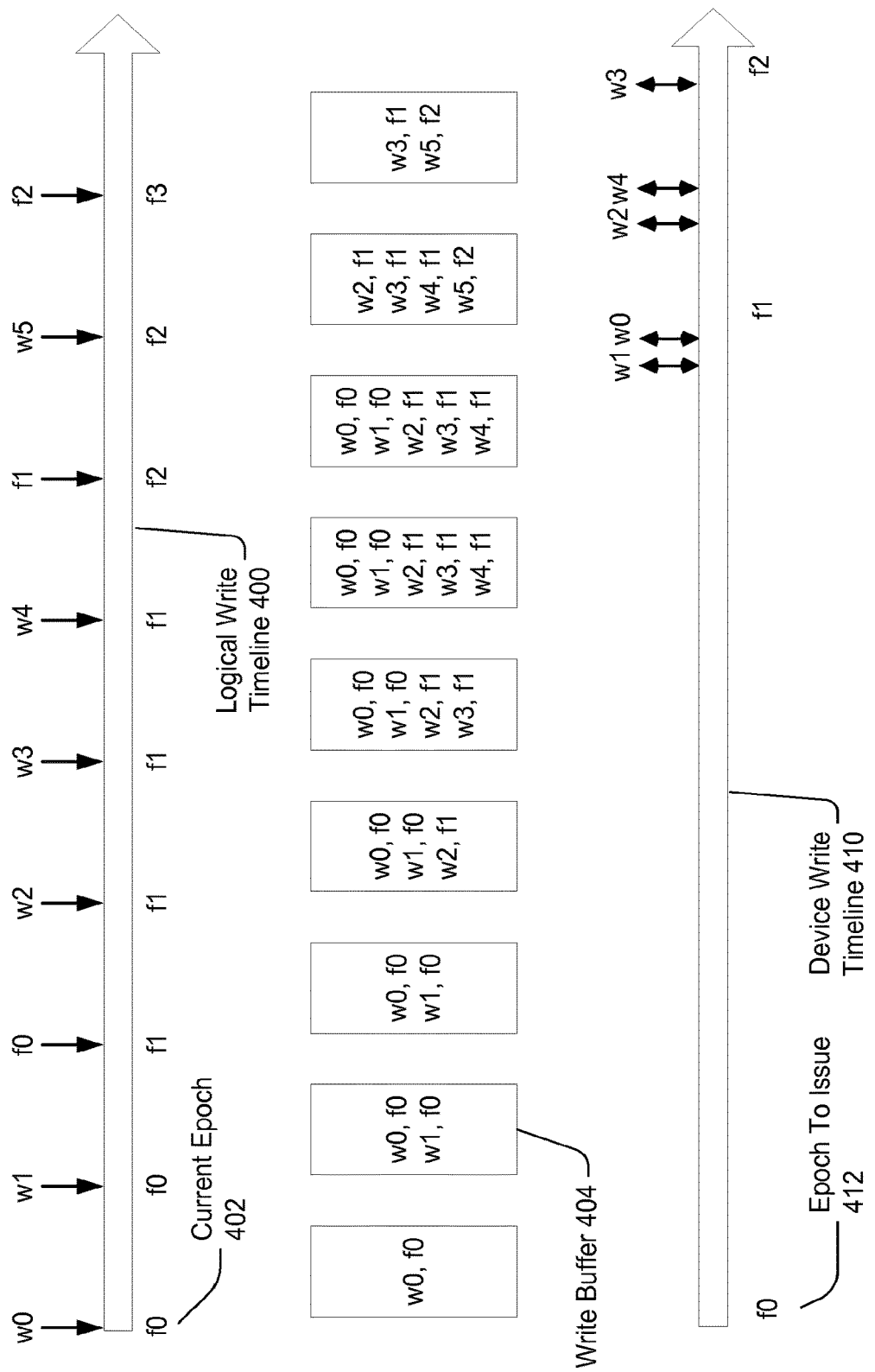
FIGS. 4, 5, 7-16, and 18 illustrate example processing and data structures consistent with some implementations of the present concepts.
Figure 5:
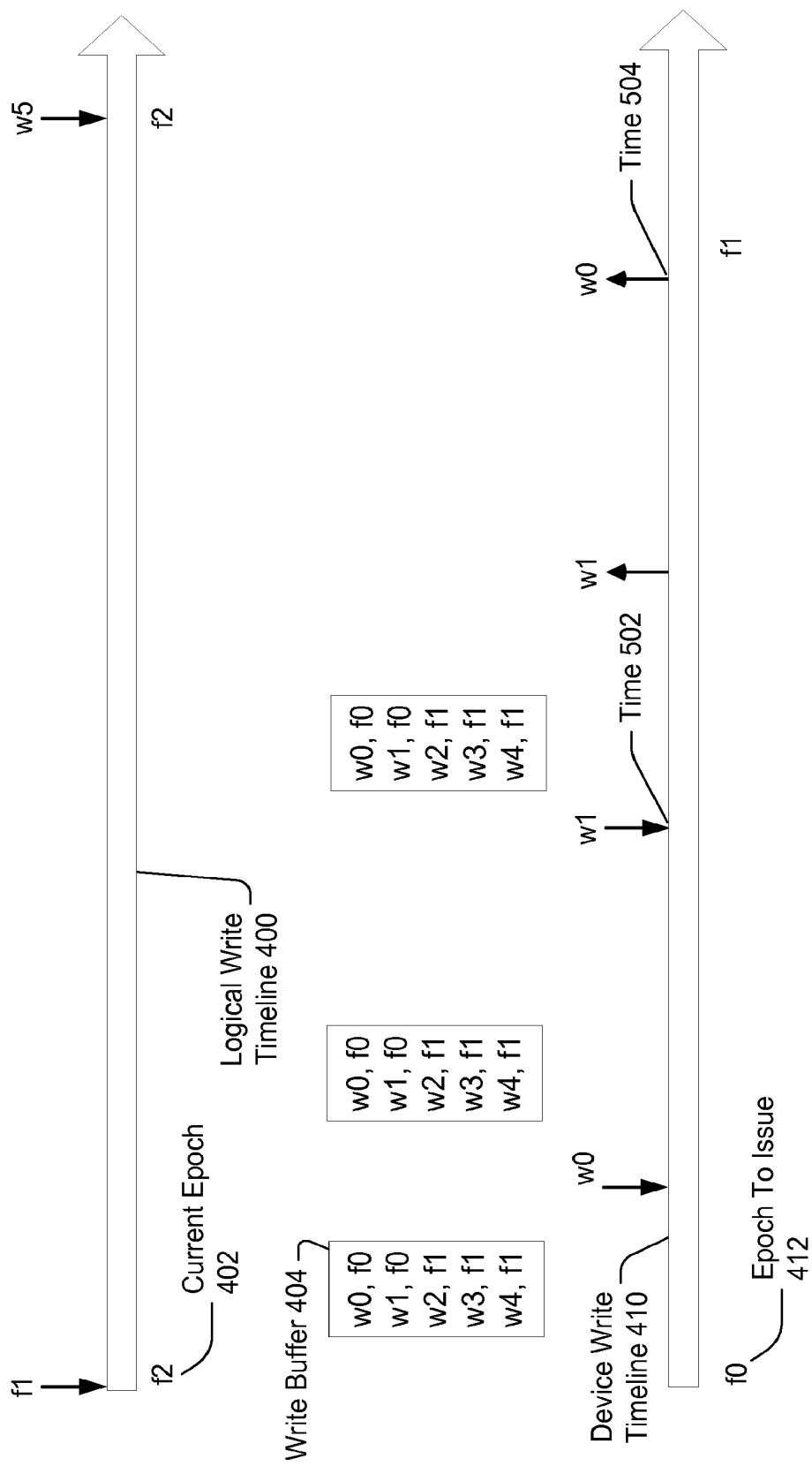

As mentioned above, some implementations may maintain an in-memory buffer used to store flushed write data. FIG. 3 shows a method 300 that can be applied in this context. For example, method 300 can be performed by the asynchronous flushing driver 120. Note that method 300 is initially discussed in a linear fashion for simplicity, but those skilled in the art will understand that blocks of method 300 may be intermingled in various orders. FIGS. 4-5 provide additional clarity in this regard.

Referring back to FIG. 3, at block 302 of method 300, logical write commands are received, e.g., from the client code 110. For example, a series of logical write commands may be issued by the client code 110. Each logical write command may have corresponding write data.

At block 304, flush commands are received from the client code 110. For example, the flush commands may be intermingled with the logical write commands, e.g., the sequence (w0, w1, f0, w2, f1) implies that logical write command w0 was received first, followed by logical write command w1, followed by flush command f0, followed by logical write command w2, followed by flush command f1, and so on.

At block 306, the write data for each logical write is tagged with a corresponding flush epoch. The following discussion adopts the convention that the term "flush epoch" refers to the first flush after a given logical write. So, w0 and w1 are in flush epoch f0, w2 is in flush epoch f1, and so on.

At block 308, the tagged write data is buffered in memory. For example, the tagged write data can be placed in a volatile memory buffer.

At block 310, the logical flushes are acknowledged by returning from the flush commands, thus allowing client code 110 to continue executing without extended blocking while waiting for the flushed write data to be committed on physical storage resources. Note that the flush commands can be acknowledged without ensuring that the flushed write data has been committed, and indeed even prior to sending device write commands to send the corresponding write data to storage.

At block 312, the write data is written from the buffer to persistent storage (e.g., physical storage devices 220, 221, 222) in a manner that ensures prefix consistency. For example, the write data can be persisted exactly in the order in which the corresponding logical write commands were received, e.g., w0, w1, w2. Alternatively, the write data can be persisted in a different order than the logical writes were received, as long as the data is written in flush epoch order. In other words, prefix consistency can be maintained by ensuring that writes are committed to physical storage without intermingling writes from different flush epochs. Thus, in this example, the writes could be persisted in the order w1, w0, w2, since writes w0 and w1 are in the same flush epoch. However, the writes could not be committed with w2 preceding either w0 or w1, since w2 is from a later flush epoch.

It may be worth noting that there can be performance reasons for issuing device write commands in a different order than the corresponding logical writes were received. For example, consider a new example where logical commands are received in the order w0, w1, f0, w2, w3, w4, f1, w5, f2. Now further assume that w4 is directly adjacent to w2 on a particular physical disk, whereas w3 requires a disk seek to a location approximately 180 degrees removed from where w2 and w4 will be written on the disk. In this case, it makes sense to write w4 immediately after writing w2 and then move the disk head over to write w3. This is acceptable as long as w5 is not committed to disk before any of w2, w3, or w4, even if w5 happens to be located very near w0 and w1. Some implementations may ensure that w5 is not committed to the disk by waiting to send w5 to the disk until after all writes prior to f1 are acknowledged as having been committed.

The aforementioned approach implies that a crash can result in missing or out-of-order writes in the last flush epoch that was issued by the client to physical storage. For example, assume a crash after w0, w1, w2, and w4 are committed to disk and before w3 is committed to disk. This is acceptable in practice because the recovered disk will still have a consistent prefix because all persisted write data for flush epochs before the epoch when the crash occurred are consistent. In this case, w0 and w1 are persistent and present a consistent prefix, e.g., all write data from f0 is persisted. With a traditional storage device, applications already know that some or all writes in the last flush epoch may not be persistent, so the aforementioned approach does not change that expectation. Note, however, that by immediately acknowledging a flush without waiting for that flush epoch's writes to become durable, the aforementioned approach may allow for more data loss to happen. This is because, in the above approach, the reception of a flush acknowledgement by the client code 110 does not signify that all writes in the corresponding epoch are durable when the flush acknowledgement is received.

To better appreciate how the aforementioned techniques can provide better performance than blocking flushes, consider again FIG. 2. At any given time, there may be multiple parallel device write commands going to multiple different physical disks, e.g., the writes may be concurrently performed by the disks themselves. Because the client code 110 is non-blocking on flush calls, the client code 110 can issue many logical write commands and flush commands without waiting for the flush commands to return, resulting in many different parallel device writes at any given time. Since crashes are generally relatively infrequent, there is relatively low risk of data loss and, in any event, such crashes are recoverable since the disclosed techniques maintain the physical storage devices in a consistent state.

Example Buffering Scheme Timeline

FIG. 4 illustrates an exemplary logical write timeline 400 and corresponding device write timeline 410 illustrating the aforementioned techniques. FIG. 4 also shows certain data items that can be used to implement the aforementioned techniques, e.g., a current epoch 402, write buffer 404, and epoch to issue 412.

Considering logical write timeline 400, this timeline illustrates the previous example where logical writes/flushes are received in the order w0, w1, f0, w2, w3, w4, f1, w5, f2. Device write timeline 410 shows corresponding device write commands that are used to persist some of the write data in storage, e.g., in the order w1, w0, w2, w4, w3. In the absence of a crash, write f5 can be committed to storage at a time after that illustrated in FIG. 4. For the purposes of the following example, assume that each device write command returns instantaneously from the corresponding physical storage device indicating success. This is illustrated by the two-way arrows for each device write, which imply that the device write is both issued to physical storage and acknowledged by the physical storage as being successful. Subsequent examples will discuss scenarios where device write latency is considered.

The current epoch 402 can be used to track the number of flush requests that have been received. Thus, the current epoch is f0 until flush f0 is received, at which point the current epoch is incremented to f1. Likewise, the current epoch stays at f1 until flush f1 is received, at which point the current epoch is incremented to f2. As discussed above, each flush can be acknowledged before any corresponding device write commands are generated and sent to the physical storage devices.

As noted above, as incoming writes are received, they are tagged and stored in the write buffer 404. Note that write buffer 404 can be an in-memory data structure, e.g., stored in volatile RAM. Thus, the contents of write buffer 404 may be lost in the event of a crash. In write buffer 404, each logical write is tagged with the corresponding current epoch. When the device write commands have been sent to physical storage and acknowledged as durable, the corresponding write data can be removed from the buffer.

The epoch to issue 412 is generally used to determine which logical write commands should be issued to physical storage via device write commands. As noted above, write data is generally committed in epoch order. This means that write data within a given epoch may be issued to physical storage in a different order than the logical write commands of the epoch are received, so long as no writes from a subsequent epoch are issued before all writes from the first epoch are acknowledged as successfully completed by underlying physical storage devices. In other words, device write commands for the subsequent epoch are not sent to the physical storage devices until all device write commands from the previous epoch have been acknowledged by the physical storage devices as having been persisted.

Consider FIG. 4, starting when logical write w0 is received. At this time, no flushes have been received, so the current epoch has a value of f0. The write data for logical write w0 is stored in the write buffer 404, tagged with epoch counter f0. Next, logical write w1 is received and the write data is likewise tagged with f0 and added to the write buffer 404.

Next, flush f0 is received, so the current epoch 402 is incremented to f1. Logical writes w2, w3, and w4 are received consecutively and the corresponding write data to the write buffer 404 as they are received, tagged with f1. Subsequently, f1 is received and the current epoch 402 is incremented to f2.

At this point in the example, no device write commands have been sent to physical storage, and all of the pending logical write commands are in the write buffer 404. Next, the asynchronous flushing driver 120 iterates through the write buffer 404 and generates corresponding device write commands for each logical write command that is tagged with the current value of epoch to issue 412, in this case, f0. Thus, writes w1 and w0 are sent to physical storage by corresponding device write commands, and then removed from the write buffer 404 when the physical storage devices acknowledge that they have been persisted.

After both w1 and w0 are reported by the physical storage devices as being persisted, all of the writes from epoch f0 have been persisted. At this time, epoch f0 is retired, and epoch to issue 412 is incremented to f1. Now, the asynchronous flushing driver 120 again iterates through the write buffer 404 and identifies writes tagged with the current value of epoch to issue 412, i.e., f1. Since writes w2, w3, and w4 are tagged with f1, the asynchronous flushing driver 120 generates device write commands to issue these writes to storage. Note, however, that w5 is tagged with f2, and thus no corresponding device write commands are generated at this time for w5. In other words, only writes from epoch f1 are sent to physical storage at this time.

Next, once writes w2 and w4 have been acknowledged as successfully persisted in physical storage, these writes are removed from the write buffer 404. Since w3 is still in the write buffer, epoch to issue 412 stays at f1 and no device writes for w5 are issued at this time. Once the physical storage devices confirm that w3 has been persisted, w3 is removed from the write buffer. Also, note that when the physical storage resources confirm that w3 has been committed to storage, all writes from epoch f1 have been persisted so epoch to issue 412 is incremented to f2. Thus, on the next iteration through the write buffer 404, the asynchronous flushing driver 120 will issue a device write command to send w5 to storage.

For simplicity, the above discussion assumed that physical storage devices perform writes instantaneously, e.g., that each issued device write command implies that the corresponding data has been committed to storage. However, in practice, each device write command has a certain amount of latency before the corresponding write data is persisted. For example, the device write command for write w1 may have been issued to the disk after the device write command for w0, but the physical storage devices may report that w1 is persistent before reporting that w0 is persistent.

FIG. 5 illustrates this subtlety by showing an expanded portion of logical write timeline 400 and device write timeline 410. Considering device write timeline 410, write w0 is issued before write w1 (as indicated by downward arrows), but write w1 is acknowledged by the physical storage resources as successfully persisting before write w0 (as indicated by upward arrows). After w0 is sent to physical storage, w0 retained in the write buffer 404 until w0 has been acknowledged as successfully persisted. To appreciate why this is the case, consider what happens if a read of the virtual storage location of w0 is performed before the device write of w0 returns success. It is possible that the write data has not been committed to storage, and a race condition could be introduced by sending a read to the physical storage resources for this location. If the read were processed by the physical storage resources before the corresponding device write were committed, then retrieved data would not reflect the write.

To address this concern, the asynchronous flushing driver 120 retains w0 in the write buffer 404 until the write data for w0 is successfully acknowledged as being persisted by the physical storage resources. Likewise, when the device write command of w1 is sent to the physical storage resources, w1 retained in the write buffer 404 until it is subsequently acknowledged as having been persisted by the physical storage resources.

While a given write is in the write buffer 404, read requests for the corresponding virtual storage block can be serviced from the write buffer instead of from the physical storage resources. Once the physical storage resources acknowledge that a given write has succeeded, that write can then be removed from the write buffer, implicitly indicating that the corresponding write data has been persisted. Thus, for example, assume that w0 is written to virtual storage block 4 and w1 is written to virtual storage block 2. If a read of virtual storage block 4 is received after the device write command of w0 has been issued to the physical storage resources but before the physical storage resources have acknowledged that w0 has been successfully committed, the read request is serviced from the write buffer during this time interval. Likewise, once the device write command for w1 is sent to the physical storage resources, the write buffer is used to service read requests for virtual storage block 2 until w1 is successfully acknowledged by the physical storage resources as having been persisted thereon.

Note that an alternative scheme may be used where a separate in-memory data structure, e.g., a "written data cache" is used to temporarily store writes that have been issued to storage but not acknowledged. In this alternative scheme, writes can be removed immediately from the write buffer when issued to storage and stored in the written data cache. Once the writes have been acknowledged as persisted, the writes are removed from the written data cache. In this alternative scheme, reads can be serviced from the written data cache instead of from the write buffer during the interval between when a given write is issued and the write is acknowledged as successfully persisted.

Note also that epoch to issue 412 is not incremented to f1 when all of the writes from epoch f0 are issued by sending corresponding device write commands to the physical storage resources, shown at time 502 in FIG. 5. Rather, f1 is not incremented until after the physical storage resources acknowledge that all of the writes from epoch f0 have been committed to storage, as shown at time 504. This, in turn, means that writes from f1 are not issued from the write buffer 404 to the physical storage resources until all of the writes from f0 have been persisted by the physical storage resources. As a consequence, writes are persisted over time in flush epoch order, e.g., all writes from flush epoch f0 are persisted before any writes from flush epoch f1 are issued, all writes from flush epoch f1 are persisted before any writes from flush epoch f2 are issued, etc.

Note that this does not mean that the individual writes within a given flush epoch are necessarily issued to the physical storage resources or persisted by the physical storage resources in any particular order. In other words, device write commands for w0 and w1 could be issued in the order (w1, w0) and/or the device writes can be committed by the physical storage resources in the order (w1, w0). As long as no writes from epoch f1 or later are issued prior to ensuring that all writes from flush epoch f0 are persisted, the physical resources are maintained in a state that ensures prefix consistency. In short, the temporal order in which the device write commands are issued is used as a consistency mechanism in the buffering implementations discussed above.

With respect to recovery, note that the aforementioned scheme performs writes such that the physical storage resources are maintained in a state with prefix-consistent write data. Thus, additional recovery mechanisms may not be involved, e.g., in the event of a crash, the data on the physical storage resources is in a prefix-consistent state without performing any post-crash recovery.

Also, note that the previous discussion assumes a one-to-one relationship between logical writes and device writes, to simplify the explanation. In practice, a given logical write may be broken into multiple corresponding device writes, e.g., by the asynchronous flushing driver 120. Likewise, a given logical read may be broken into multiple corresponding device reads, e.g. by the asynchronous flushing driver 120, which then merges them into a single item of read data that is returned to the client code 110. For the purposes of the disclosed buffering scheme and method 300, prefix consistency can be ensured so long as each device write is processed as discussed above according to its designated flush epoch, irrespective of whether the corresponding logical write also involves multiple device writes.

Logging Scheme

In the examples discussed above, write data for logical write commands was not sent to the physical storage devices via corresponding device write commands until all writes from all previous epochs were committed by the physical storage devices. This scheme may be particularly suited for scenarios where there is sufficient physical memory to store the entire write buffer 404. However, because the client code 110 is not blocking on flush commands while waiting for the physical storage resources to commit the write data, the client code 110 may be able to issue writes at a sufficient rate that maintaining an in-memory buffer becomes problematic (e.g., due to physical memory limitations).

Thus, another scheme may issue writes to physical storage without waiting for previous epochs to retire while still acknowledging flushes before the write data is committed by the physical storage devices. To ensure prefix consistency in these implementations, a log structure can be persisted on the physical storage devices with write data from received writes. The log structure can log each write in a physical location that corresponds to the order that the writes are received from the client code 110 (e.g., consecutive physical locations or permuted in a known fashion). This implies that writes are physically issued to the log in flush epoch order, whether or not they are temporally committed in flush epoch order. Upon recovery from a crash, the asynchronous flushing driver can iterate through the log in flush epoch order and recover to a consistent state.

Figure 6:
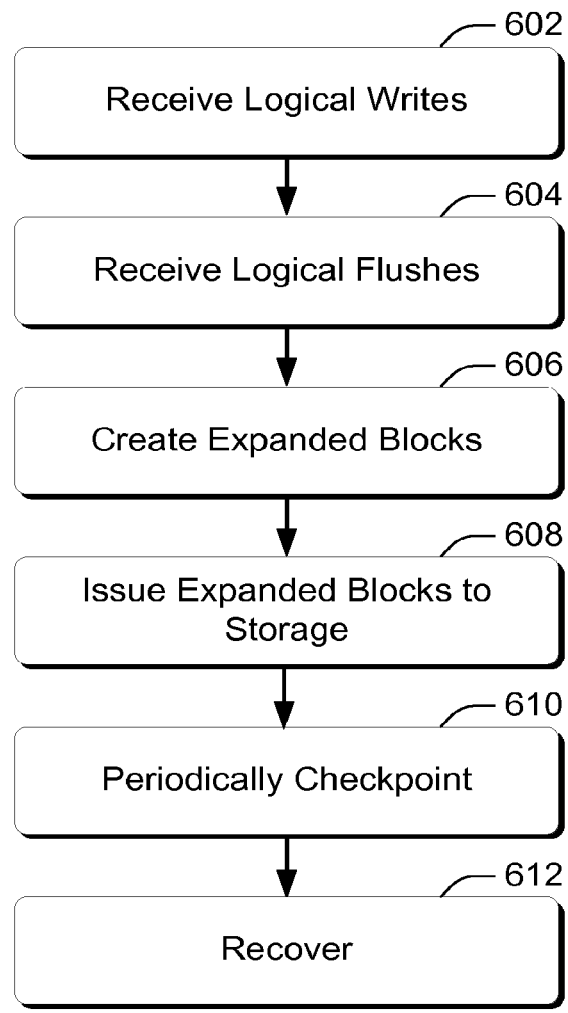

FIG. 6 shows a method 600 that can be applied to use a persistent log to provide prefix consistency when asynchronous flushes are performed. For example, method 600 can be performed by the asynchronous flushing driver 120. As with method 300 above, method 600 is initially discussed in a linear fashion for simplicity.

At block 602, logical writes are received from the client code 110. For example, a series of logical writes may be issued directly by the application 112 or by the file system 116 on behalf of the application 112.

At block 604, logical flushes are received from the client code 110. As previously noted, the logical flushes may be intermingled with the logical writes. As also previously noted, the flushes may be issued directly by the application 112 or by the file system 116 on behalf of the application 112.

At block 606, expanded blocks are created for the logical writes. The expanded blocks can include both the write data of the logical writes along with additional consistency data added by the asynchronous flushing driver 120. For example, the consistency data can identify the flush epoch for each individual logical write, as well as other information discussed in more detail below.

At block 608, the expanded blocks are issued to physical storage resources via corresponding device write commands with the consistency data included therein. For example, as discussed more below, the device write commands may be issued into a persistent log in a physical order that corresponds to the temporal order in which the logical writes are received. The physical storage resources may commit writes in a different order than they were issued by the client code 110; however, the asynchronous flushing driver 120 can use the consistency data in the expanded blocks to determine which writes were actually committed to the log. Of those writes that were actually committed, the asynchronous flushing driver can determine which committed writes should be accepted as a valid prefix ordering of the write stream.

At block 610, periodic checkpoints are performed. For example, checkpoint information such as the current epoch number, a mapping of virtual blocks to physical blocks in the persistent log, indicators of which physical blocks are currently valid (i.e., mapped to virtual blocks), and other checkpoint information can be committed to the physical storage resources. In some cases, the checkpoint operation involves synchronous writes to the physical storage devices, e.g., the asynchronous flushing driver 120 blocks while waiting for the checkpoint information to be written. Note that this may not involve blocking the client code 110, but rather the asynchronous flushing driver 120 can determine a suitable time to perform the synchronous checkpoint write operations.

At block 612, recovery is performed, e.g., after a crash. As discussed in more detail herein, the most recent checkpoint data can be used to identify a location in the persistent log to begin recovery. From this point, the persistent log can be rolled forward until prefix consistency can no longer be guaranteed. The physical log can be arranged on the physical storage resources in a predetermined order, e.g., across various physical devices.

Figure 7:
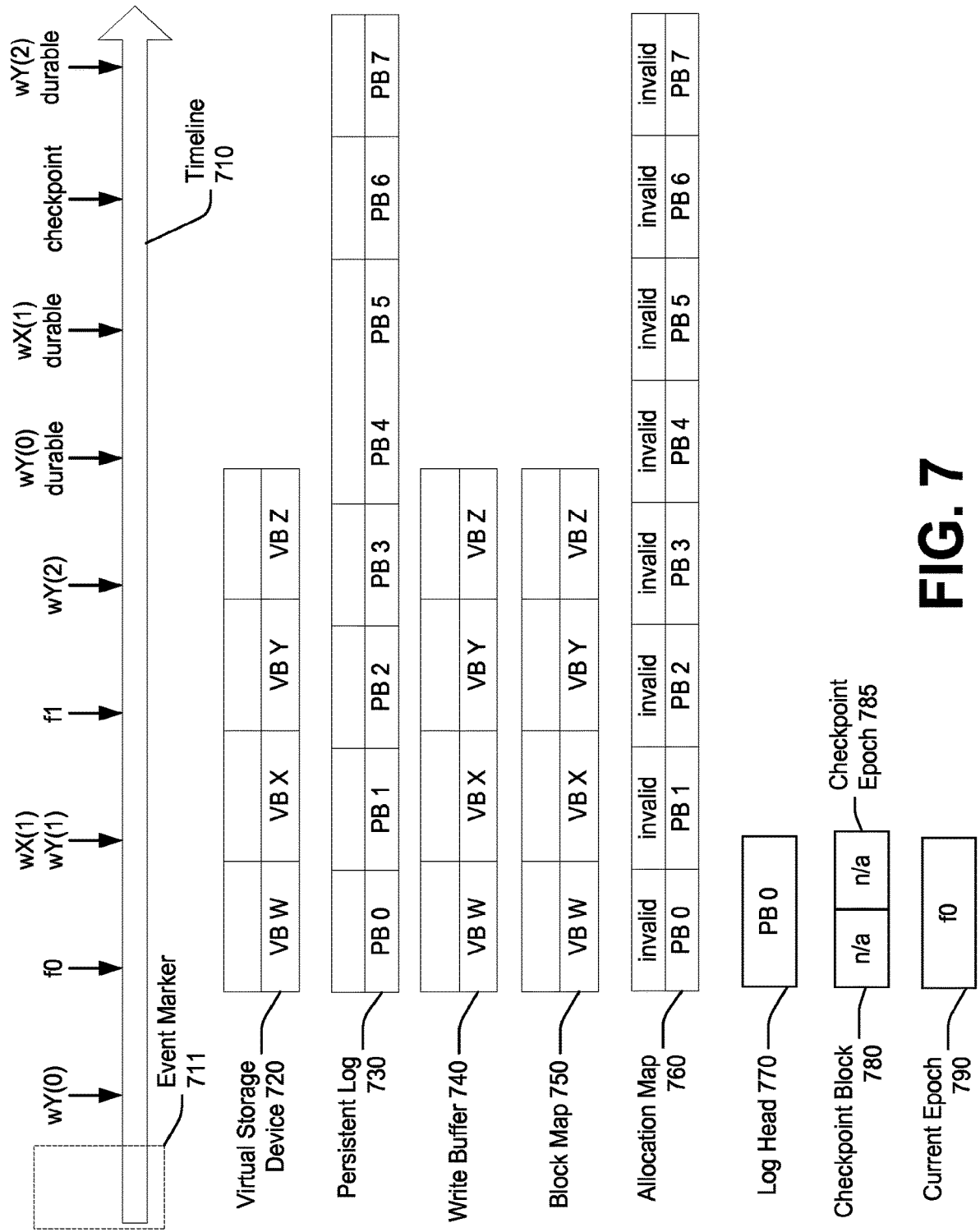
Figure 8:
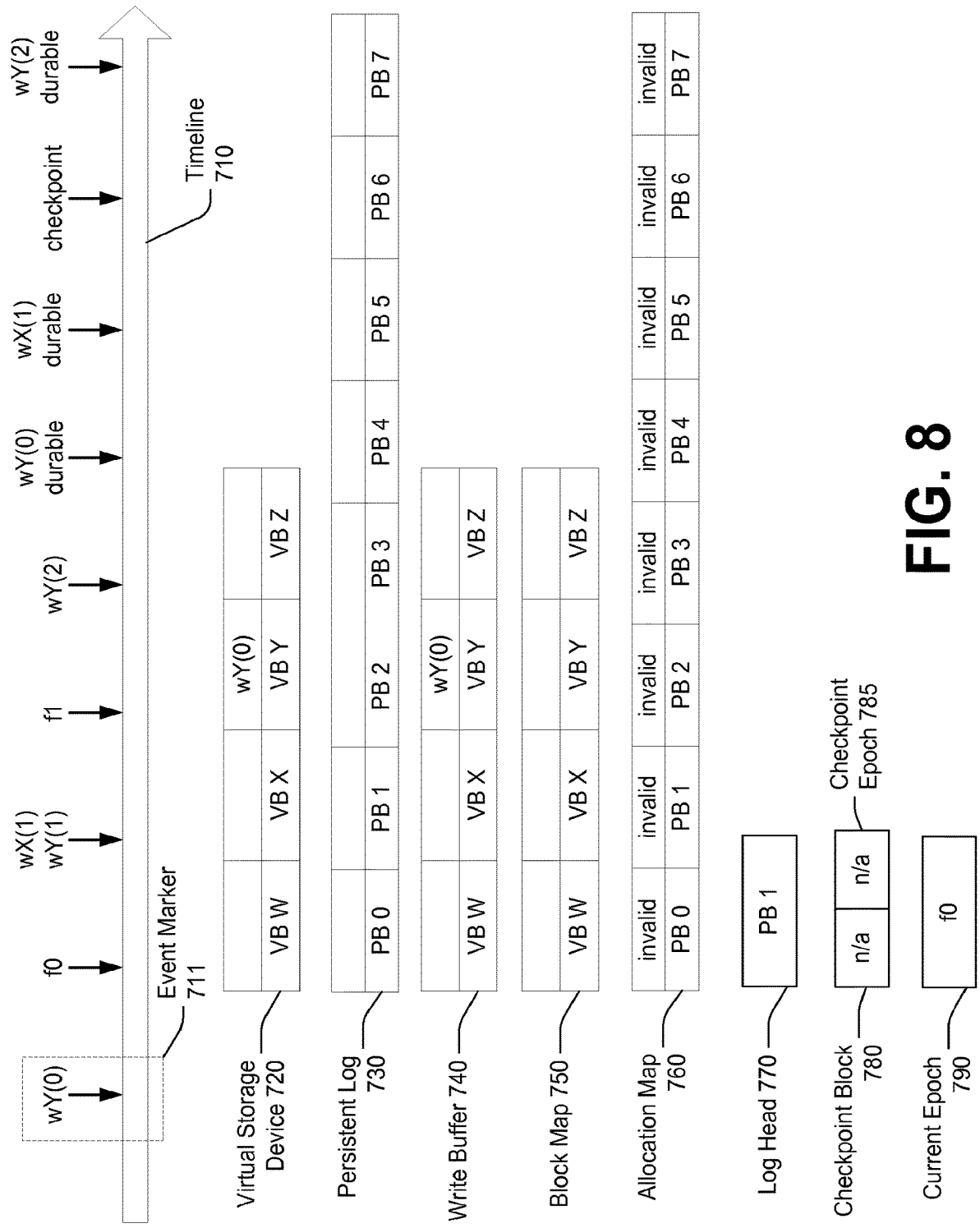
Figure 9:
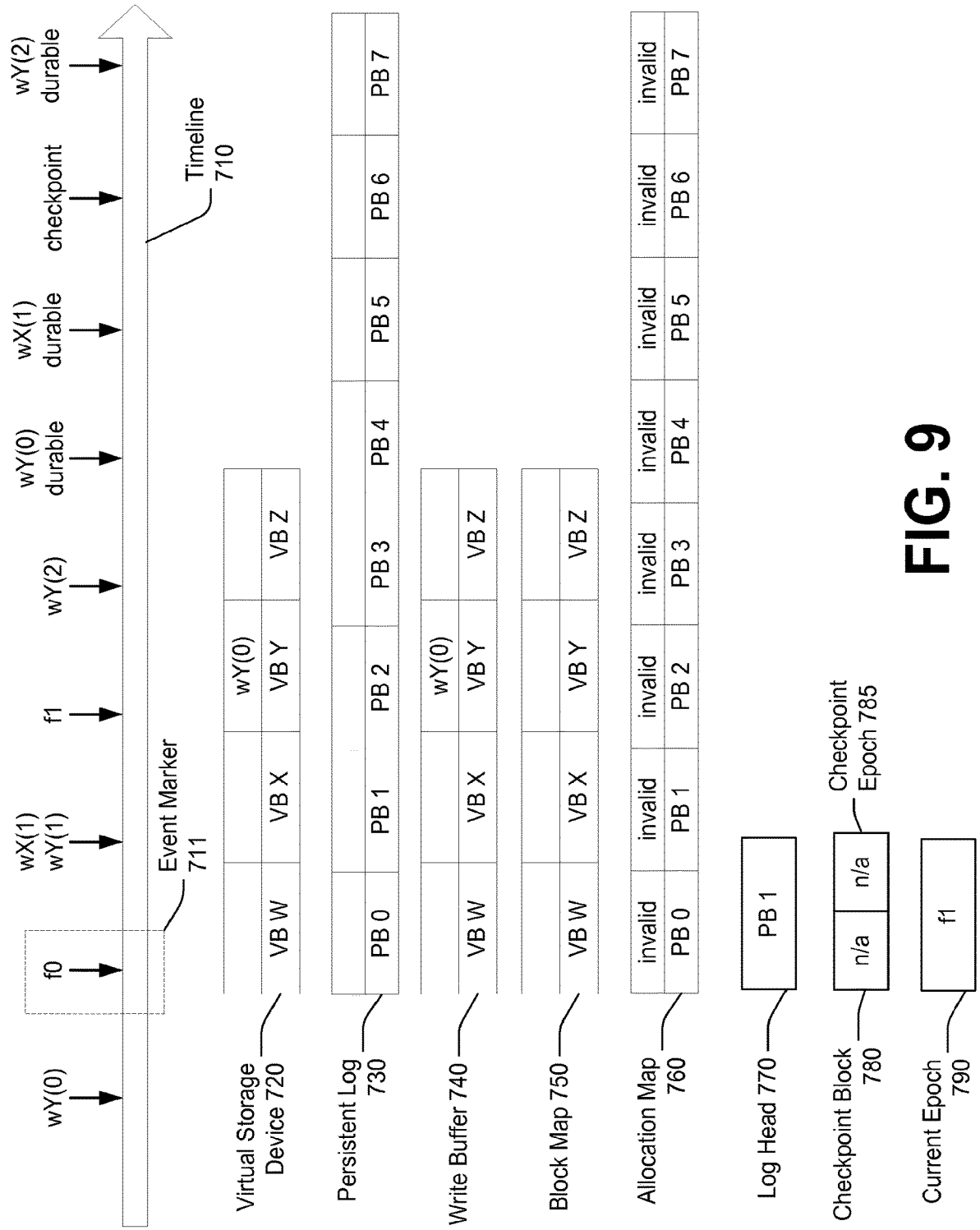

FIG. 7 illustrates an example timeline 710 of events that can be processed using method 600. Timeline 710 includes a series of events identified by event marker 711, which is shown in FIG. 7 as preceding all illustrated events. FIG. 7 also shows items including a virtual storage device 720, a persistent log 730, a write buffer 740, a block map 750, an allocation map 760, a log head 770, a checkpoint block 780, a checkpoint epoch 785, and a current epoch 790. Generally speaking, FIGS. 7-16 illustrate how these items change state over time when processing the events of timeline 710, and event marker 711 moves accordingly to illustrate the event associated with the figure. For example, FIG. 7 shows state before processing any events, FIG. 8 shows state after processing a write wY(0), FIG. 9 shows state after processing a flush f0, and so on.

Generally, data structures shown in FIG. 7 can be used to ensure prefix consistency of persistent storage while permitting flushes to be acknowledged without having the client code 110 wait for the flushes to return. For example, writes to the virtual storage device 720 can be maintained in the persistent log 730. Note that the persistent log 730 is shown as a single contiguous array of blocks, but that each physical block of the persistent log 730 may be stored on different physical disks. For example, physical blocks 0, 3, 6, (denoted PB 0, PB 3, and PB 6 in FIG. 7) and so on may be stored on a first disk, physical blocks 1, 4, 7 and so on stored on a second disk, and physical blocks 2, 5, 8 and so on a third disk. The write buffer 740 can store write data for various writes, and writes for a given flush epoch can be removed from the write buffer 740 when all writes for the flush epoch have been confirmed as committed to the persistent log 730. The block map 750 can be used to map where particular virtual blocks are stored in the persistent log. The allocation map 760 can be used to track whether the data in a given physical block of the persistent log 730 is "valid" (currently serving as backing storage for a given virtual block) or "invalid" (not currently serving as backing storage for any physical block). The log head 770 can track the physical block where the next write will be stored in the persistent log 730. The checkpoint block 780 and checkpoint epoch 785 can be periodically updated and can be stored in persistent storage during checkpointing operations as discussed herein. For example, the checkpoint block can be the last block in the persistent log 730 for which all previous writes are known to have persisted, and the checkpoint epoch can be the last known prefix-consistent epoch, e.g., the epoch of the checkpoint block. The current epoch 790 can track the current flush epoch, and can at times identify epochs that are not prefix-consistent.

Considering FIG. 7, no events have been processed, so each of the aforementioned items are in an initialized state, e.g., empty virtual storage device 720, persistent log 730, and write buffer 740, empty block map 750 and allocation map 760, log head pointing at the first block of the persistent log (PB 0), N/A or null values for checkpoint block 780 and checkpoint epoch 785, and a current epoch 790 of f0. As discussed more below, each of these items will be shown as they are updated chronologically by processing events in a manner consistent with method 600.

Now, consider FIG. 8. Event marker 711 is now identifying a write wY(0), which means a logical write is received from the client code 110 during flush epoch f0 to virtual block Y. At this time, the asynchronous flushing driver 120 can check the log head (PB 0) and issue a corresponding disk write command immediately to the physical storage device where PB 0 is stored. The asynchronous flushing driver 120 can also increment the log head 770 to the next physical storage block in the persistent log, PB 1. The asynchronous flushing driver 120 can acknowledge the logical write and the client code 110 can continue processing. The asynchronous flushing driver 120 can update the write buffer 740 to reflect the write data of wY(0) in virtual block Y, and the write buffer 740 can be used to service read requests to virtual block Y while virtual block Y is in the write buffer 740. Thus, conceptually, the virtual storage device 720 has the write data for wY(0) stored therein at this time, since reads to virtual block Y will retrieve the write data for wY(0) from the write buffer 740. This is the case even though the wY(0) may not have yet been committed by the physical storage devices to the persistent log 730.

Note that the device write commands issued to the physical storage devices may include more than just the associated write data. For example, the asynchronous flushing driver 120 may write an expanded block to physical storage to assist in subsequent recovery operations. The expanded block can include the write data for the write as well as recovery information. For example, the recovery information can include the virtual block ID where the write is stored and the epoch number of the write, i.e., current epoch 790. The recovery information of the expanded block can also include an error detection code, e.g., a cyclic redundancy check (CRC) code, that is applied to the write data, the virtual block ID, and the epoch number.

Next, FIG. 9 shows processing state after the next event is processed, a flush f0 received from the client code 110. The asynchronous flushing driver 120 updates the current epoch 790 to f1 and acknowledges the flush before all write data from flush epoch 0, e.g., wY(0), is known to be persisted in storage. This, in turn, allows the client code 110 to continue processing without blocking while waiting for the write data from wY(0) to be persisted.

Figure 10:
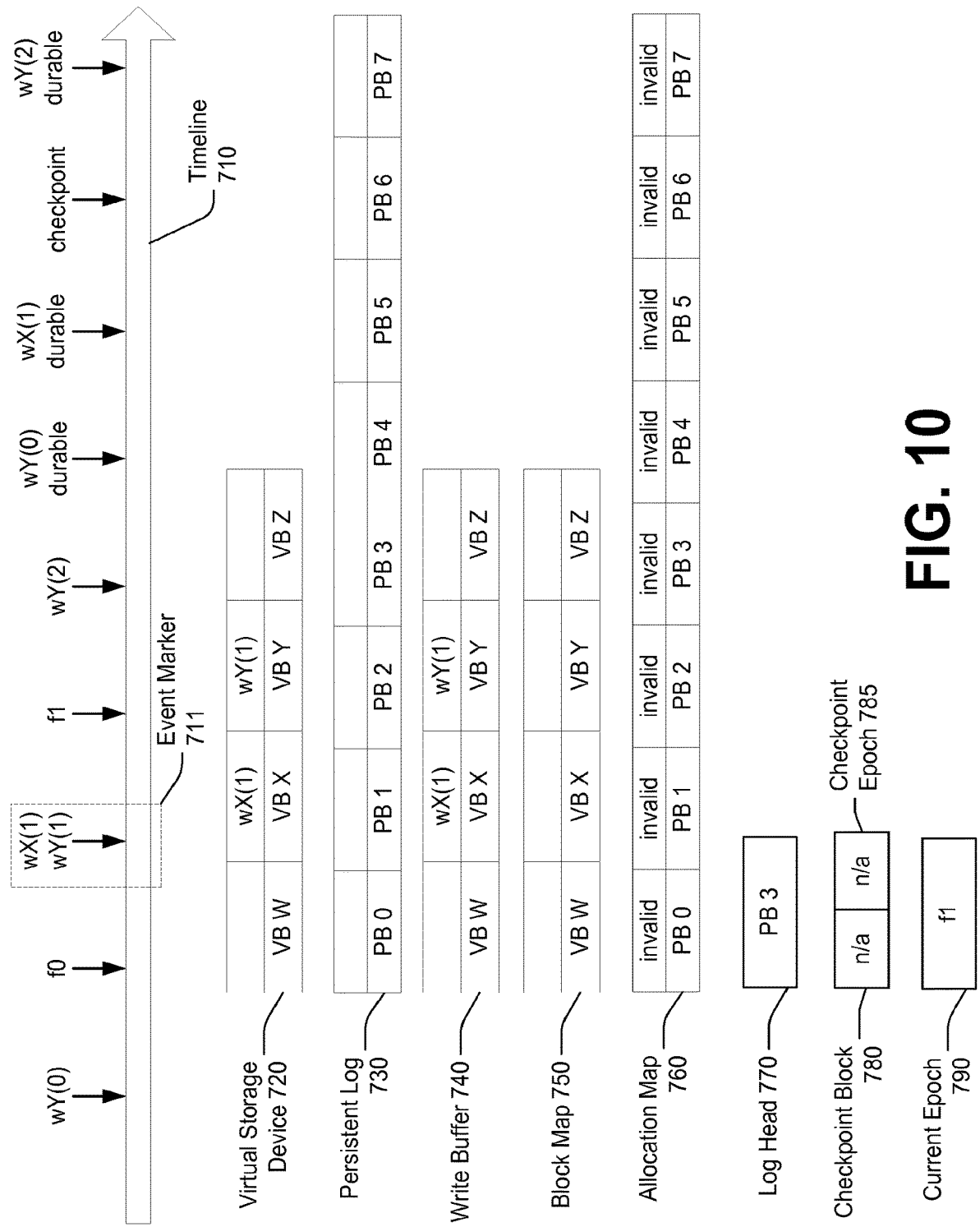

Next, FIG. 10 shows processing state after two logical writes are received, a first write wX(1) to virtual block X during flush epoch f1 and another write wY(1) to virtual block Y during flush epoch f1. At this time, the asynchronous flushing driver 120 can check the log head (PB 1) and issue wX(1) immediately to the physical storage device where PB 1 is stored, increment the log head to PB 2 (not shown in FIG. 10), issue write wY(1) to the physical storage device where PB 2 is stored, and increment the log head again to PB 3. The asynchronous flushing driver 120 can acknowledge the logical writes and the client code 110 can continue processing. Again, note that each of the device write commands can be implemented using an expanded block as discussed above with respect to write wY(0).

The asynchronous flushing driver 120 can also update the write buffer 740 to reflect both the write to virtual block X and the write to virtual block Y (overwriting write data for wY(0) with write data for wY(1)), and the write buffer 740 can be used to service read requests to both of these virtual blocks when they are present in the write buffer 740. Thus, conceptually, the virtual storage device 720 has wX(1) and wY(1) stored therein at this time, since reads to virtual block X will retrieve the write data for wX(1) from the write buffer 740 and reads to virtual block Y will retrieve the write data for wY(1) from the write buffer 740.

Figure 11:
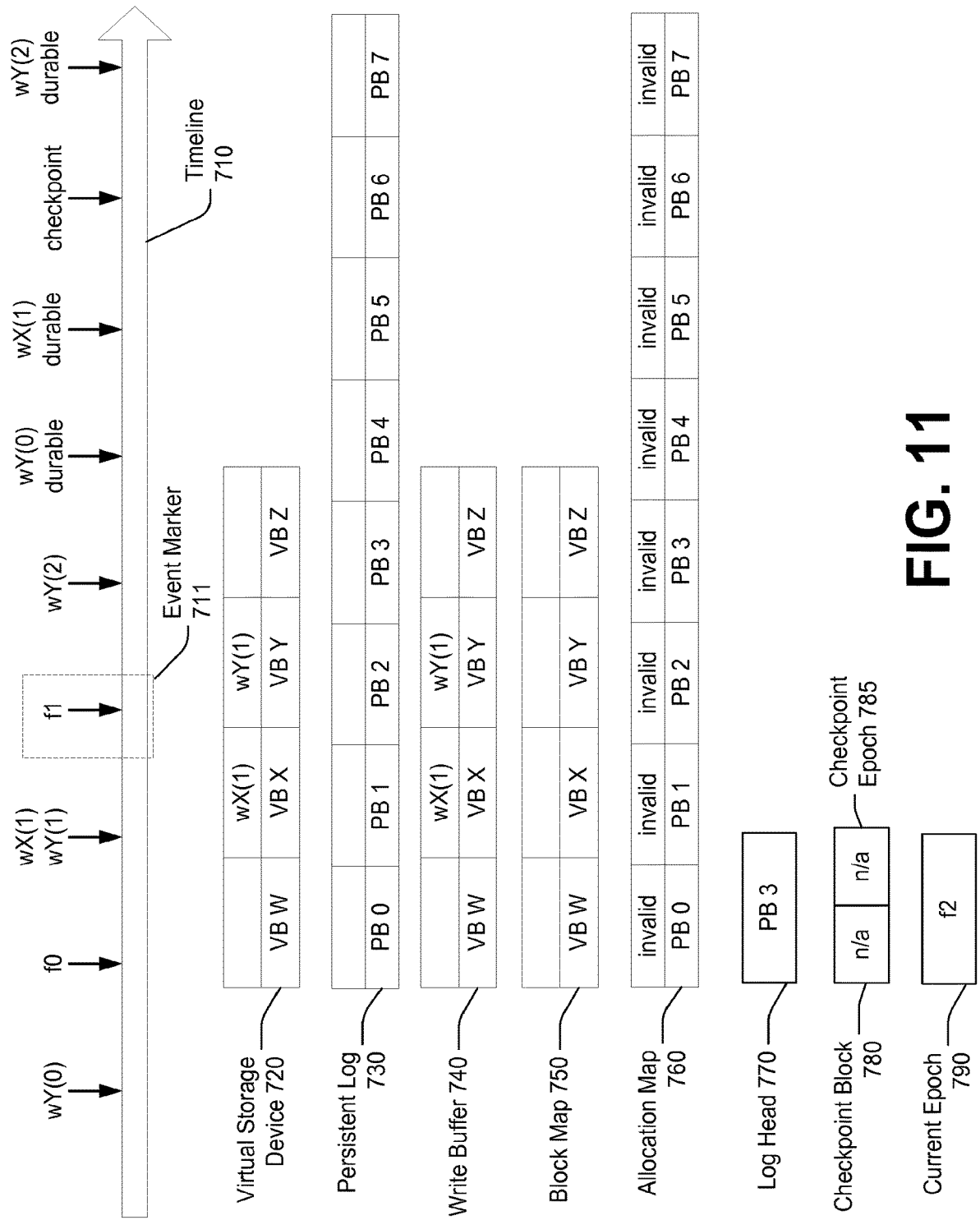

Next, FIG. 11 shows processing state after the next event is processed, a flush f1 received from the client code 110. The asynchronous flushing driver 120 updates the current epoch 790 to f2 and acknowledges the flush before any of the writes from flush epochs f0 and f1 are persisted in the physical storage devices. This, in turn, allows the client code 110 to continue processing without blocking while waiting for any of these writes to be persisted.

Figure 12:
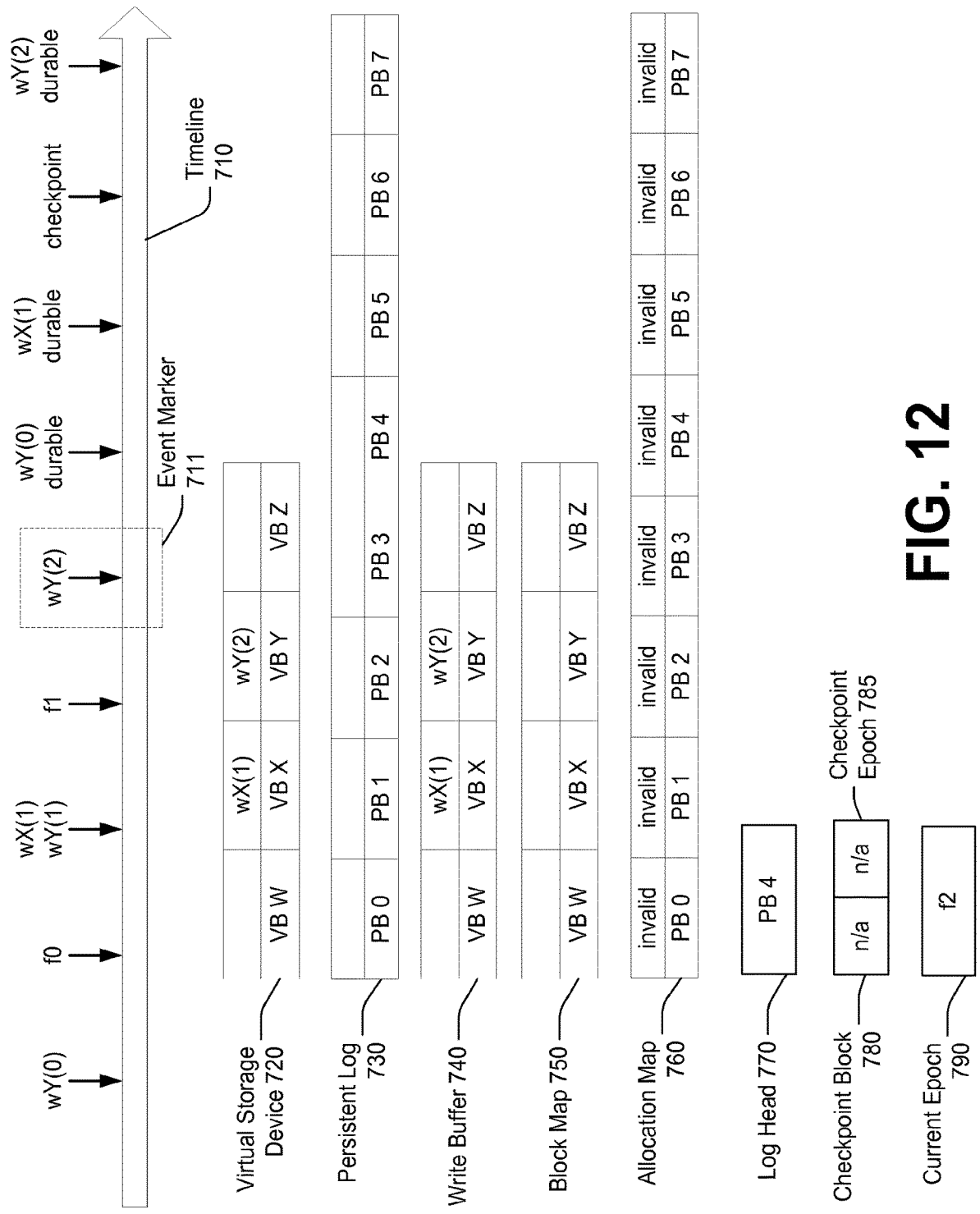

Next, FIG. 12 shows processing state after a write wY(2) to virtual block Y is received and processed during flush epoch f2. At this time, the asynchronous flushing driver 120 can check the log head (PB 3) and issue wY(2) (as an expanded block) immediately to the physical storage device where PB 3 is stored and increment the log head to PB 4. The asynchronous flushing driver 120 can acknowledge the write and the client code 110 can continue processing. The asynchronous flushing driver 120 can update the write buffer 740 to reflect the write to virtual block Y (overwriting wY(1) with wY(2)), and the write buffer 740 can continue to be used to service read requests to virtual block Y and virtual block X, which is also still in the write buffer. Thus, conceptually, the virtual storage device 720 has wX(1) and wY(2) stored therein at this time, since reads to virtual block X will retrieve the write data for wX(1) from the write buffer and reads to virtual block Y will retrieve the write data for wY(2) from the write buffer. Note, at this time, that the asynchronous flushing driver 120 does not know whether any of wY(0), wX(1), or wY(1) ever became durable.

Figure 13:
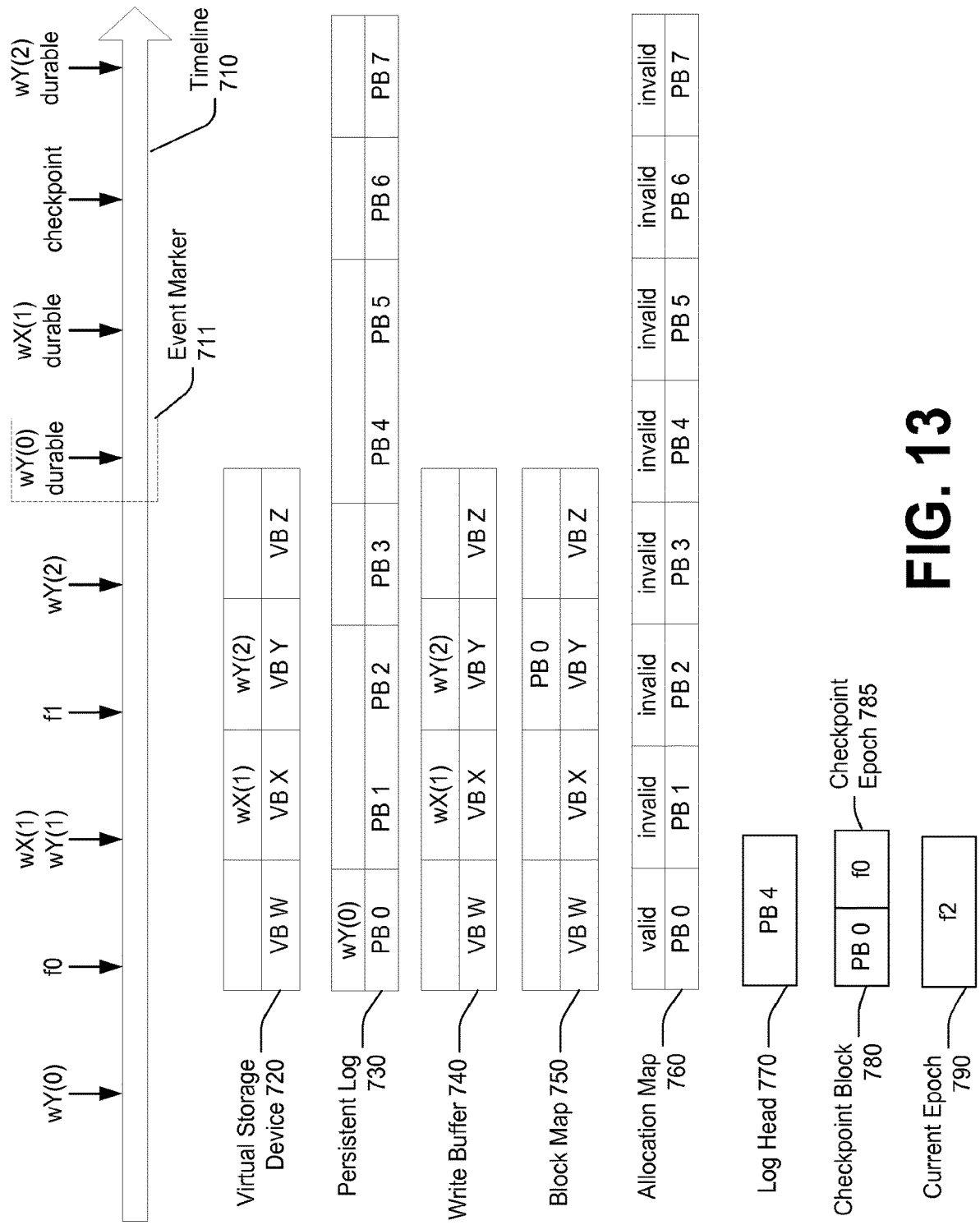

Next, FIG. 13 shows processing state after the asynchronous flushing driver 120 learns that wY(0) has been made durable. For example, the physical storage device that stores PB 0 may report that the write of wY(0) to that physical block has succeeded. Note that wY(0) may have been persisted to PB 0 at any time after the write was issued by the asynchronous flushing driver 120. However, the asynchronous flushing driver 120 does not know whether this is the case until acknowledged by the physical storage device. Thus, FIG. 13 illustrates state from the viewpoint of the asynchronous flushing driver 120. Since the write of wY(0) to PB 0 is the only write in flush epoch f0, this flush epoch has been retired and all writes from this epoch are known to persistent in storage. Since this is the first epoch, this also implies that flush epoch f0 is present on the physical storage devices in a prefix consistent state. At this time, the asynchronous flushing driver 120 can update the checkpoint block 780 and checkpoint epoch 785 to PB 0 and f0, respectively. The general idea here is that, in the event of a crash, recovery can begin at the next physical block after the physical block that has been checkpointed and iterate through other persisted writes until prefix consistency can no longer be ensured.

When a given epoch is retired, the asynchronous flushing driver 120 can remove the writes from that epoch from the write buffer 740 and update the block map 750 and the allocation map 760. In this example, the block map 750 is updated to show that virtual block Y is stored at physical block 0, and the allocation map 760 is updated to show that physical block 0 contains valid data. Note that waiting to update block map 750 and allocation map 760 until a given epoch is retired can be useful for recovering to a consistent prefix, since the block map 750 and allocation map 760 may be persisted during checkpoint operations as discussed more below. The general idea is that these two data structures are updated in "increments" of an entire durable flush epoch and collectively identify correct mappings of virtual to physical blocks as of the time the flush epoch is retired.

Figure 14:
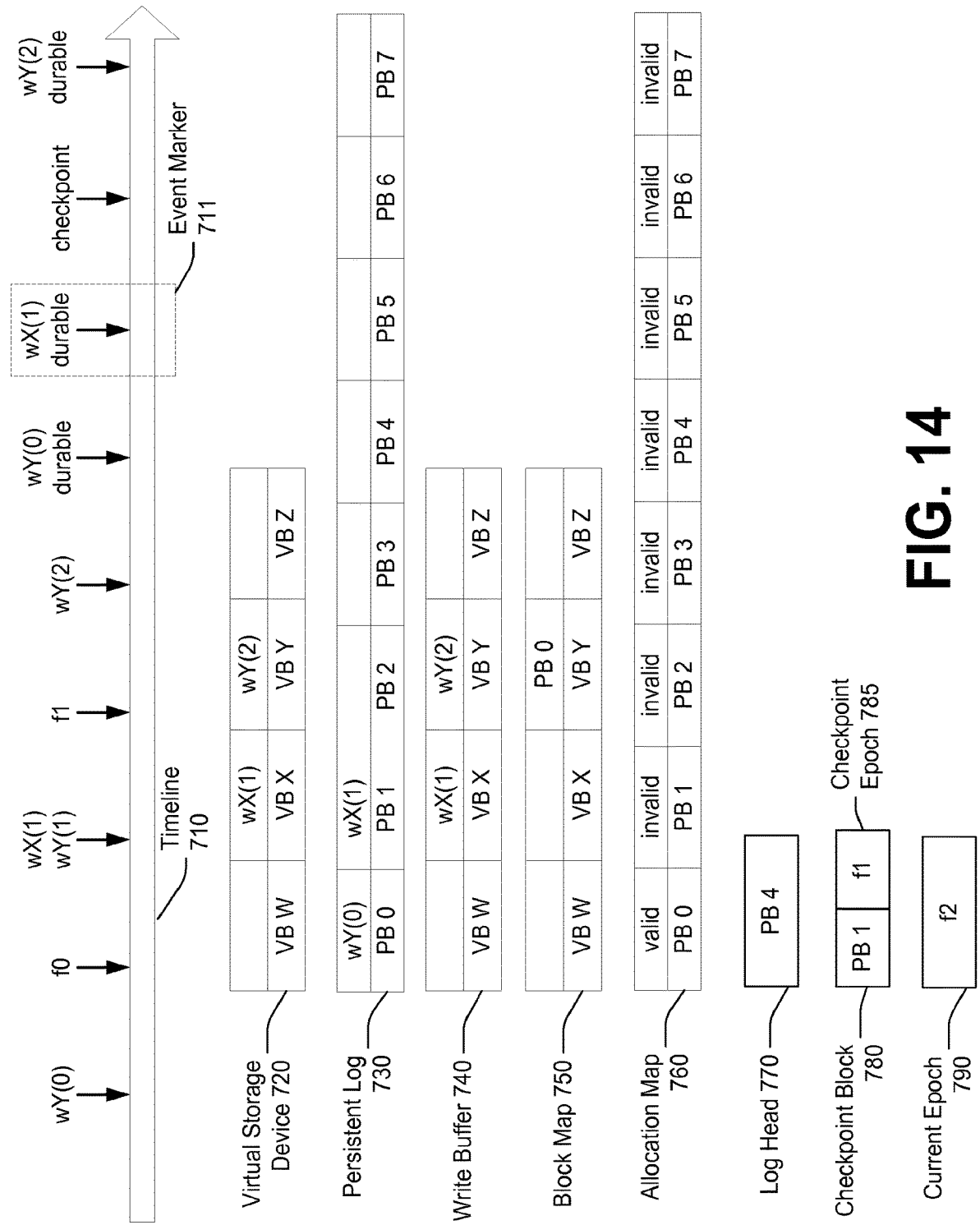

Next, FIG. 14 shows processing state after the asynchronous flushing driver 120 learns that wX(1) has been made durable. For example, the physical storage device that stores PB 1 may report that the write of wX(1) to PB 1 has succeeded. Thus, the persistent log 730 shown in FIG. 14 now shows wX(1) in PB 1. As discussed above with respect to wY(0), wX(1) may have become persistent sooner, but the asynchronous flushing driver 120 was not certain that the write was persistent until it was acknowledged by the physical storage device as a successful write. Also, note that wX(1) is not the only write from epoch f1. Since all writes for epoch f1 have not yet been confirmed as being persisted on physical storage, the epoch has not yet been retired. Thus, the block map 750 and the allocation map 760 can be left in their previous state, and the write buffer 740 can also remain unaltered after processing wX(1). However, the asynchronous flushing driver 120 can update the checkpoint block 780 to PB 1 and checkpoint epoch 785 to f1, since the asynchronous flushing driver 120 now knows that this write succeeded and that all writes prior to wX(1) have persisted. This is the case even though there are outstanding writes from flush epoch f1 that are not yet known to be persisted.

Figure 15:
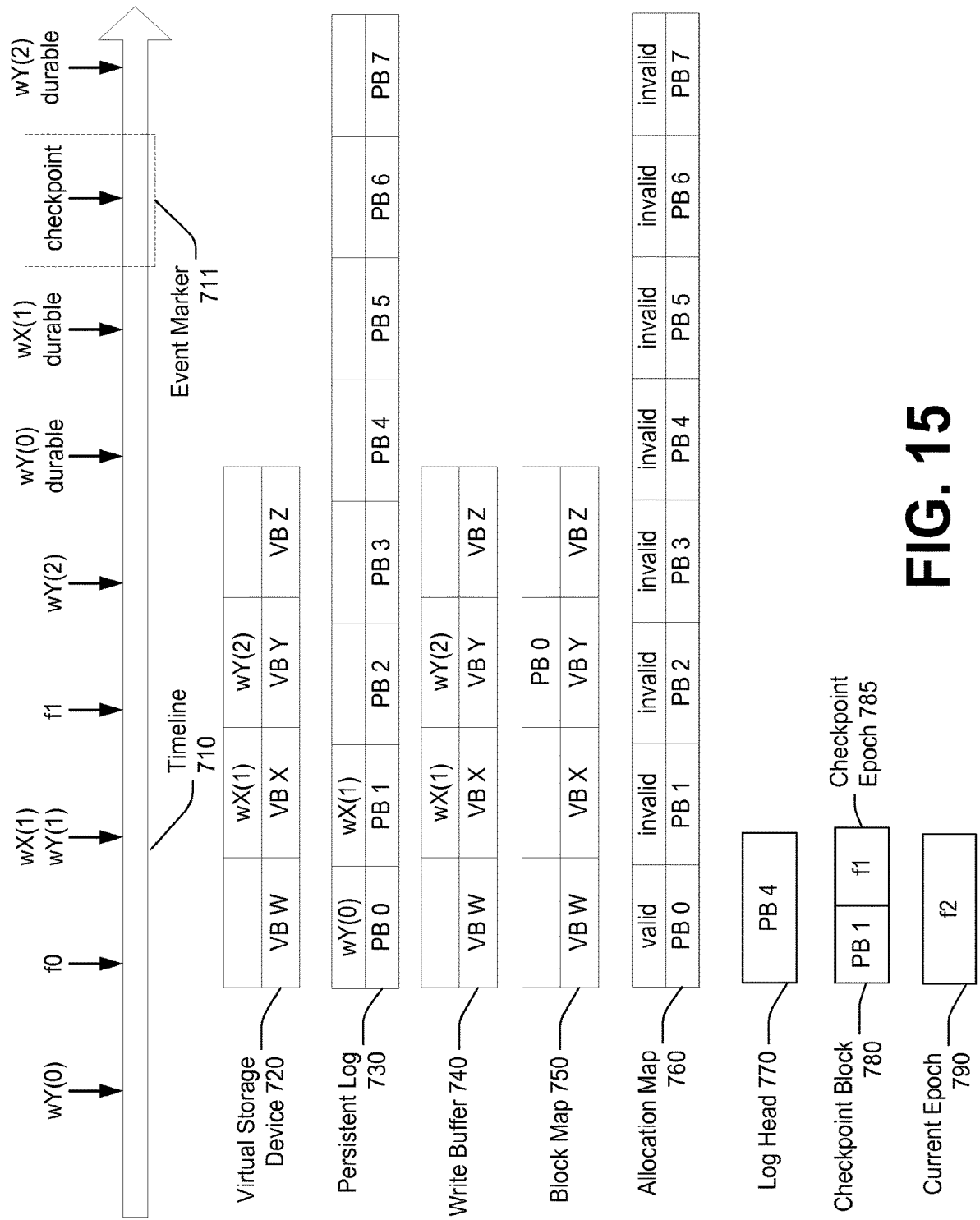

Next, FIG. 15 illustrates processing during a checkpoint operation. When a checkpoint occurs, the asynchronous flushing driver 120 may perform a synchronous write to storage of the block map 750, the allocation map 760, the checkpoint block 780, and the checkpoint epoch 785. An error correction code such as a CRC can also be applied to these three quantities. Note that checkpointing operations merely imply a synchronous write of the checkpointing information discussed herein, and not a synchronous write of outstanding logical writes received from client code 110. In other words, the asynchronous flushing driver 120 will flush the checkpoint data and wait for the flush operation to finish, but the client code 110 can continue to issue flushes asynchronously, i.e., without blocking.

Figure 16:
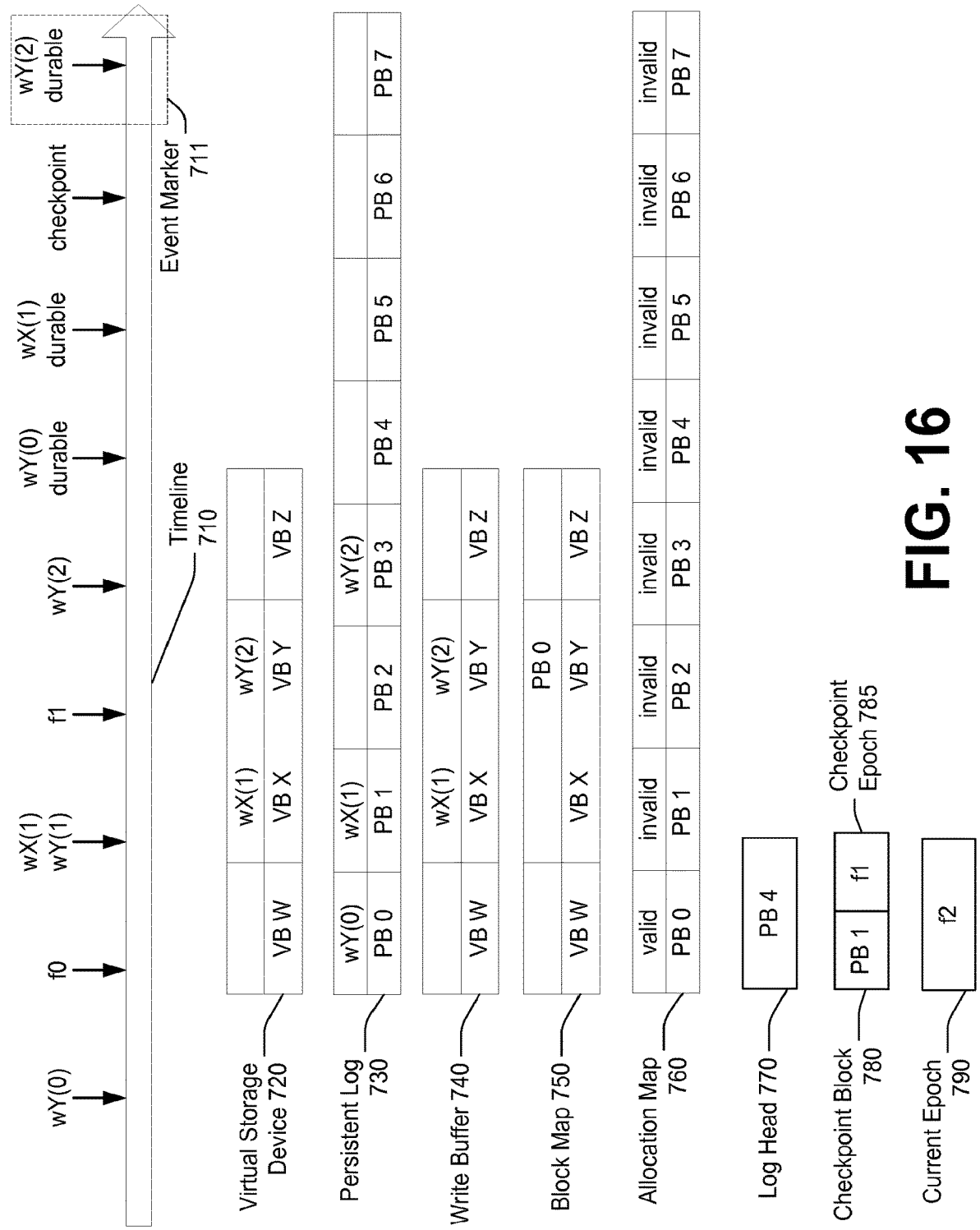

Next, FIG. 16 illustrates processing state after the asynchronous flushing driver 120 learns that wY(2) has been made durable. For example, the physical storage device that stores PB 3 may report that the write of wY(2) to that physical block has succeeded. Thus, the persistent log 730 shown in FIG. 16 now shows wY(2) in PB 3. Also, note that it is not certain whether wY(2) is the only write in epoch 2, since the next flush operation f2 has yet to be received. Furthermore, the previous epoch has not been retired. In this case, the block map 750 and the allocation map 760 can be left in their previous state, and the write buffer 740 can also remain unaltered. Moreover, because it is not yet known whether wY(1) has been persisted, it is not known whether all writes prior to wY(2) are persistent. Thus, the checkpoint block 780 and checkpoint epoch 785 remain unchanged at this time, leaving PB 1 as the checkpoint block and f1 as the checkpoint epoch.

Generally, the aforementioned scheme allows flushes to be performed asynchronously, thus allowing the client code 110 to continue executing without blocking while waiting for flushes to return. Note that the aforementioned scheme also issues writes to physical storage so that the physical locations of the writes correspond to the epoch order. In other words, even assuming the writes are committed out of order temporally by the physical storage devices, they are physically located on physical storage in a known order such that, upon recovery, the recovery procedure can iterate through the persistent log 730 in epoch order. As a consequence, crash recovery can be performed to a point that ensures prefix consistency, even if write data is lost as a result of the crash.

As with the discussion of the buffering scheme, the discussion of the logging scheme uses a simplifying assumption of a one-to-one relationship between logical writes and device writes. In a similar manner as discussed above, for the purposes of the disclosed logging scheme and method 600, prefix consistency can be ensured so long as each device write is processed as discussed above according to its designated flush epoch, irrespective of whether the corresponding logical write involves multiple device writes.

Also, note that over time the asynchronous flushing driver 120 may reach the end of the persistent log 730. When this occurs, the asynchronous flushing driver can wrap back to the beginning of the persistent log and, for subsequent writes, can skip over blocks in the persistent log that are currently being used as backing storage for virtual blocks. The asynchronous flushing driver can do so by checking the allocation map 760 and skipping over physical blocks that are currently marked as valid and issuing writes to the next physical block marked as invalid.

Furthermore, note that reads can be handled using both write buffer 740 and persistent log 730. When a write to a given virtual block is currently in the write buffer, the asynchronous flushing driver 120 may retrieve the requested data from the write buffer instead of from the persistent log. When this is not the case, the asynchronous flushing driver may check the block map 750 to determine the physical block where the virtual block is currently stored and retrieve the requested data from that physical block.

Crash Recovery in Logging Scheme

As mentioned above, the logging scheme allows for iterating through the persistent log 730 in epoch order. Moreover, the writes include recovery information that can be used to discern whether the writes successfully completed. These characteristics of the persistent log can allow for recovery to a prefix-consistent state in the event of a crash.

Figure 17:
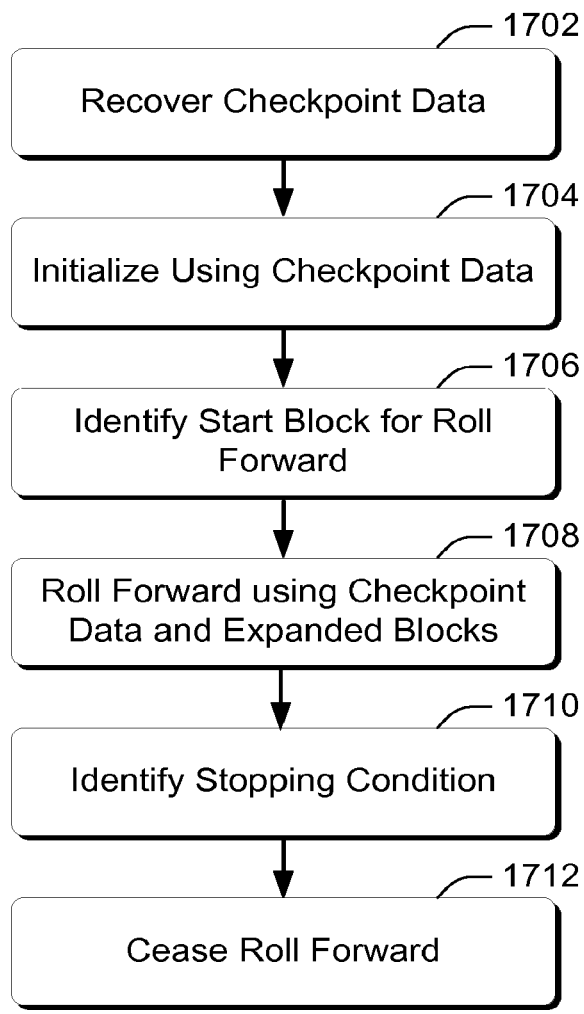

FIG. 17 shows a method 1700 that can be applied to recover to a prefix-consistent state using the persistent log, the checkpointed data, and the recovery information stored in the expanded blocks. For example, method 1700 can be performed by asynchronous flushing driver 120. As with previous method examples, method 1700 will be discussed in a linear fashion at an overview level initially, with additional clarifying examples provided thereafter.

At block 1702, checkpoint data is recovered. For example, the block map 750, allocation map 760, checkpoint block 780, and checkpoint epoch 785 can be recovered from persistent storage.

At block 1704, the checkpoint data can be used for initialization purposes. For example, the recovered checkpoint data can be used to initialize in-memory values for the block map 750 and the allocation map 760.

At block 1706, a starting block for roll-forward can be identified. For example, the starting block can be the next physical block after the checkpoint block that was recovered at block 1704.

At block 1708, the method rolls forward through the persistent log 730 recovering write data that persisted prior to a crash. For example, if possible while ensuring prefix consistency, the method can update the block map 750 and allocation map 760 to identify where recovered writes are stored.

At block 1710, a stopping condition is identified where further roll forward may not provide recovery to a prefix-consistent state. For example, the stopping condition can be identified using the recovery information that was written to the expanded blocks, as discussed in more detail below.

At block 1712, the roll forward is ceased and the persistent log 730 is recovered to a prefix-consistent state. Generally, the method updates the block map 750 and allocation map 760 so that these data structures map virtual blocks to the persistent log in a prefix-consistent manner. In other words, even assuming the persistent log itself includes writes that are persisted in a manner that could break prefix consistency, the mappings provided by the block map 750 and allocation map 760 ensure that this does not happen. This occurs because each read from the client code 110 to a given virtual block is processed using the mappings from the block map and allocation map to identify the corresponding physical block from which the data will be read. Since the block map and the allocation map identify a prefix-consistent portion of the persistent log, the client code 110 will see a prefix-consistent version of the virtual disk 200 upon recovery.

For example, suppose a crash occurs after the checkpoint illustrated in FIG. 15, and before wY(1) is written to physical block 2. When the computing device reboots, recovery can be performed by retrieving the checkpoint data from storage. First, the CRC of the checkpoint data is confirmed. If the CRC fails, a previous checkpoint can be used instead. Next, the asynchronous flushing driver 120 extracts the checkpointed information, e.g., the block map 750, the allocation map 760, the checkpoint block 780 and the checkpoint epoch 785.

Figure 18:
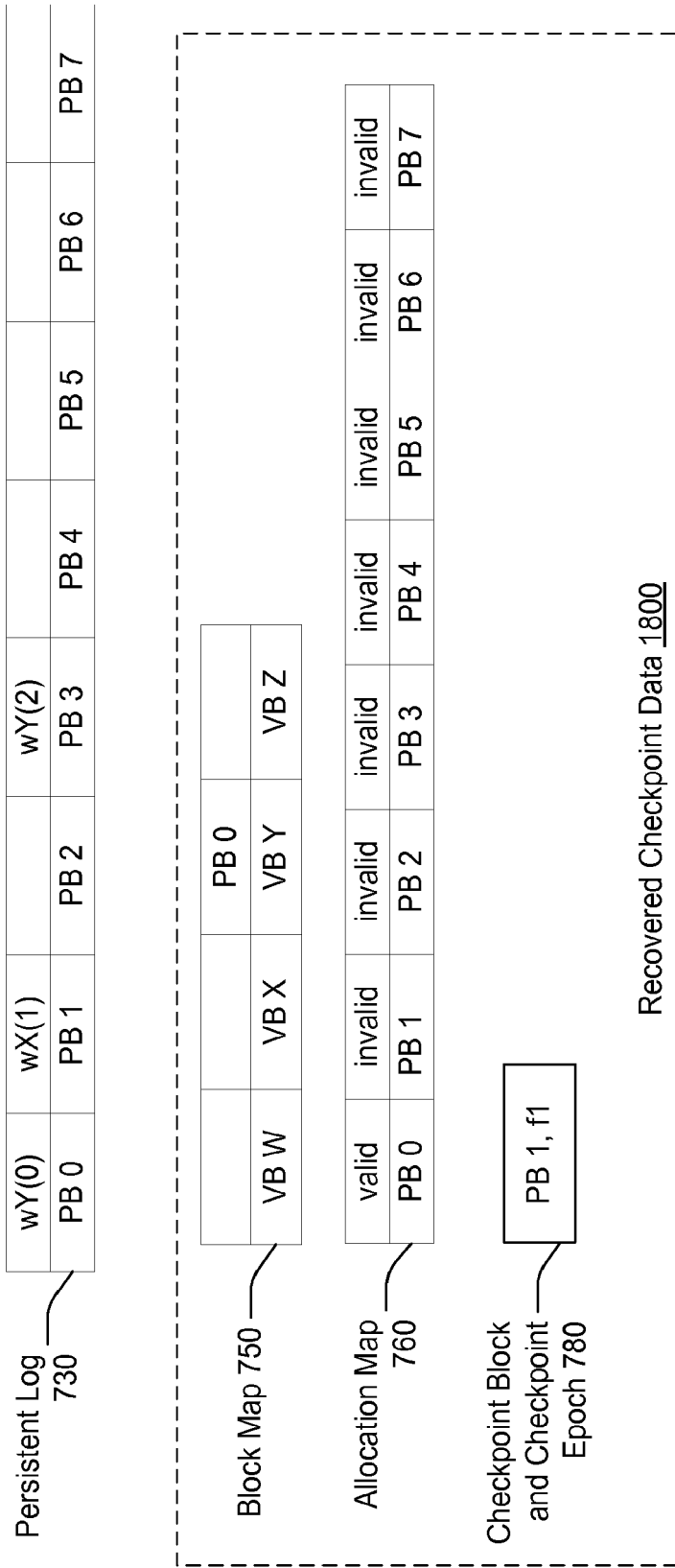

To illustrate this example, FIG. 18 illustrates recovered checkpoint data 1800, which includes the checkpoint data that was written as discussed previously with respect to FIG. 15. Moreover, FIG. 18 shows persistent log 730 with wY(2) persisted therein, as discussed above with respect to FIG. 16. Thus, FIG. 18 illustrates the state of the physical storage resources upon recovery from a crash before wY(1) is persisted.

Upon rebooting from the crash, the asynchronous flushing driver 120 can initialize the block map 750 and the allocation map 760 using the recovered checkpoint data. At this point, the block map shows that virtual block Y is stored in PB 0, and the allocation map shows that PB 0 is valid and currently in use. Thus, the write data wY(0) stored at PB 0 is recoverable.

Next, the asynchronous flushing driver rolls forward in the persistent log 730, starting at the next physical block after the checkpointed block and iterating through subsequent blocks until a stopping condition is reached. For the purposes of the following, the term "current block" means the current block being evaluated for recovery purposes.

In this case, the checkpoint block is PB 1, so recovery begins after the current block at PB 2. If the allocation map 760 indicates the current physical block is valid (in use), the asynchronous flushing driver 120 designates the next physical block (perhaps on a different disk, as discussed above) as the current block and continues rolling forward. This can occur, for example, when the persistent log wrapped around to the beginning of the log prior to the crash. Otherwise, if the allocation map indicates that the current physical block is invalid, the asynchronous flushing driver evaluates the current block for a stopping condition. Here, the allocation map does not indicate that PB 2 is in use, so PB 2 is evaluated for a stopping condition.

One example stopping condition is that the CRC of the expanded block is inconsistent. The general idea here is that an inconsistent CRC code may indicate that the write started but did not complete. In this example, this could have occurred because the write of wY(1) was not successfully acknowledged prior to the crash.

Another example stopping condition occurs when the allocation map 760 indicates the current block is not in use and the epoch number of the current block is less than the recovered checkpoint epoch 785. This can be useful for recovering in the case where the write of wY(1) to PB 2 never started and the previous write data is still present in the persistent log 730. The general idea here is that, since the allocation map indicates the current block is not in use, then it was not known whether the current block could be recovered to a prefix-consistent state at the time of the checkpoint. If the epoch number of the current block is less than the recovered checkpoint epoch, then the roll-forward is terminated. In some cases, the persistent log can be initialized with expanded blocks having a flush epoch of negative 1 before write logging begins. This will ensure that this stopping condition will occur during recovery when the first write to a given physical block is issued before a crash but never actually begins, since the first write to a given flush epoch will have an epoch of at least f0. Since flush epochs are incremented in a monotonically increasing fashion, this stopping condition will continue to apply once a given physical block has been written to one or more times during write logging.

In the above example, one of the stopping conditions applies to PB 2 and no physical blocks after the checkpoint block are recovered. Alternatively, consider the case where neither stopping condition applies, and the current physical block is recoverable to a prefix-consistent state. To recover such a current physical block, the asynchronous flushing driver 120 can update the allocation map 760 to mark the current physical block as valid and thus currently in use. The asynchronous flushing driver can retrieve the virtual block ID from the expanded block written at the current block and update the block map to point to the current physical block. The asynchronous flushing driver can also mark the previous physical block for the retrieved virtual block as invalid, if present in the allocation map.

After recovering a given current physical block, the asynchronous flushing driver can move to the next position in the persistent log, designate the next position as the current physical block, and evaluate the current physical block using the stopping conditions mentioned above. If either stopping condition is met, then the roll-forward can be terminated and the log head 770 set to the position where roll-forward is terminated.

In the example introduced with respect to FIG. 18, no blocks after the checkpoint block 780 (PB 1) were recovered, so the log head can be set to PB 2. Thus, write wY(2) is lost even though the write is physically present in the persistent log. Because the block map and allocation map have not been updated to map virtual block Y to PB 3, where wY(2) was persisted, the client code 110 will still be presented with a prefix-consistent state when reading from the persistent log 730.

Note that the previous example illustrates a short roll forward through the persistent log 730 where the stopping conditions apply immediately. However, in other cases, the roll forward may recover multiple writes or even multiple flush epochs worth of persisted data. For example, assume that, prior to a crash, all writes for flush epochs f1 through f10 are persisted on disk, and each flush epoch includes 10 writes. Further, assume flush epoch f11 includes another 10 writes, all of which persisted before the crash except for write 7.

Further assume that the last checkpoint was performed when the asynchronous flushing driver knew that epochs f1 through f5 had persisted, and also that the first three writes and the fifth write for epoch f6 had persisted. In this case, upon recovering from the crash, the asynchronous flushing driver 120 will recover the following checkpointed data: (1) block map 750 with mappings of virtual blocks to physical blocks for each write of epochs f1 through f5, but not any of the writes for epochs f6 and later, (2) allocation map 760 with correct indications of which physical blocks contain valid writes for each write of epochs f1 through f5 (including accounting for any virtual blocks overwritten during these epochs) but not any of the writes for epochs f6 and later, (3) checkpoint block 780 identifying the physical block where the third write of epoch f6 was persisted as the checkpoint block, and (4) f6 as the checkpoint epoch 785. This is because, at the time of the checkpoint operation, the last write for which all prior writes were known to be persisted was the third write of epoch f6. Even though the fifth write from epoch f6 had also persisted at the time of the checkpoint operation, the fourth write from epoch f6 had not, so the checkpoint block 780 does not reflect the persisted fifth write of epoch f6.

Now, the roll forward in this example begins at the fourth write of epoch f6 as the current block. Although not persisted when the checkpoint occurred, this write did persist prior to the crash. Considering the first stopping condition, the allocation map 760 will indicate that the current block is not valid, but the epoch number in the physical block will be f6, which is not less than the checkpoint epoch of f6. Thus, the first stopping condition is not met. Since the write persisted in full, the CRC code should be valid and thus the second stopping condition is not met either.

At this time, the asynchronous flushing driver 120 can recover the fourth write of epoch f6. To do so, the block map 750 can be updated by recovering the virtual block ID from the expanded block and mapping this virtual block to the current block. The allocation map can be updated so that the current block is indicated as valid. At this time, if roll forward were terminated, any reads of this virtual block ID would be retrieved from the current block.

Now, the current block is incremented to the fifth write of epoch f6. Since this write persisted but was not persisted as of the checkpoint, the processing will proceed as noted above for the fourth write of epoch f6, resulting in another update of the block map 750 and allocation map 760. This process can continue through all writes in epochs f6 through f10, and also through the first 6 writes of epoch f11. In the current example, the seventh write of epoch f11 did not fully persist prior to the crash. If the write were never initiated in the first place, then the epoch number retrieved from the expanded block should be a lower epoch number than the checkpointed epoch, and the first stopping condition will be met. If the write were initiated but did not complete, then the CRC should be incorrect and the second stopping condition is met. In either case, roll forward can cease, having recovered epochs f6-f10 in full even though these epochs were retired after the checkpoint operation. In addition, the first six writes of epoch f11 are also recovered. Note, however, that writes 8-10 of epoch f11 are not recovered in this example even though these writes did persist prior to the crash.

Permutation

In the examples discussed above, it was assumed that each write went to the next consecutive location in the persistent log 730. In this case, checkpointing the last known position in the persistent log for which all previous writes have persisted is sufficient to store a location where subsequent recovery operations can begin. In further implementations, other permutation algorithms can be used, e.g., the permutation algorithm can specify that the first write goes to physical block 18 of the persistent log, the second write goes to block 3, etc. For example, the permutation algorithm can be a linear congruential generator that takes integer parameters and outputs a corresponding physical block number. These integer parameters can also be stored as part of the checkpointing operation to initialize the linear congruential generator upon recovery, where one of the checkpointed integer parameters represents the last location in the permutation for which all previous writes are known to have persisted.

Example System

Figure 19:
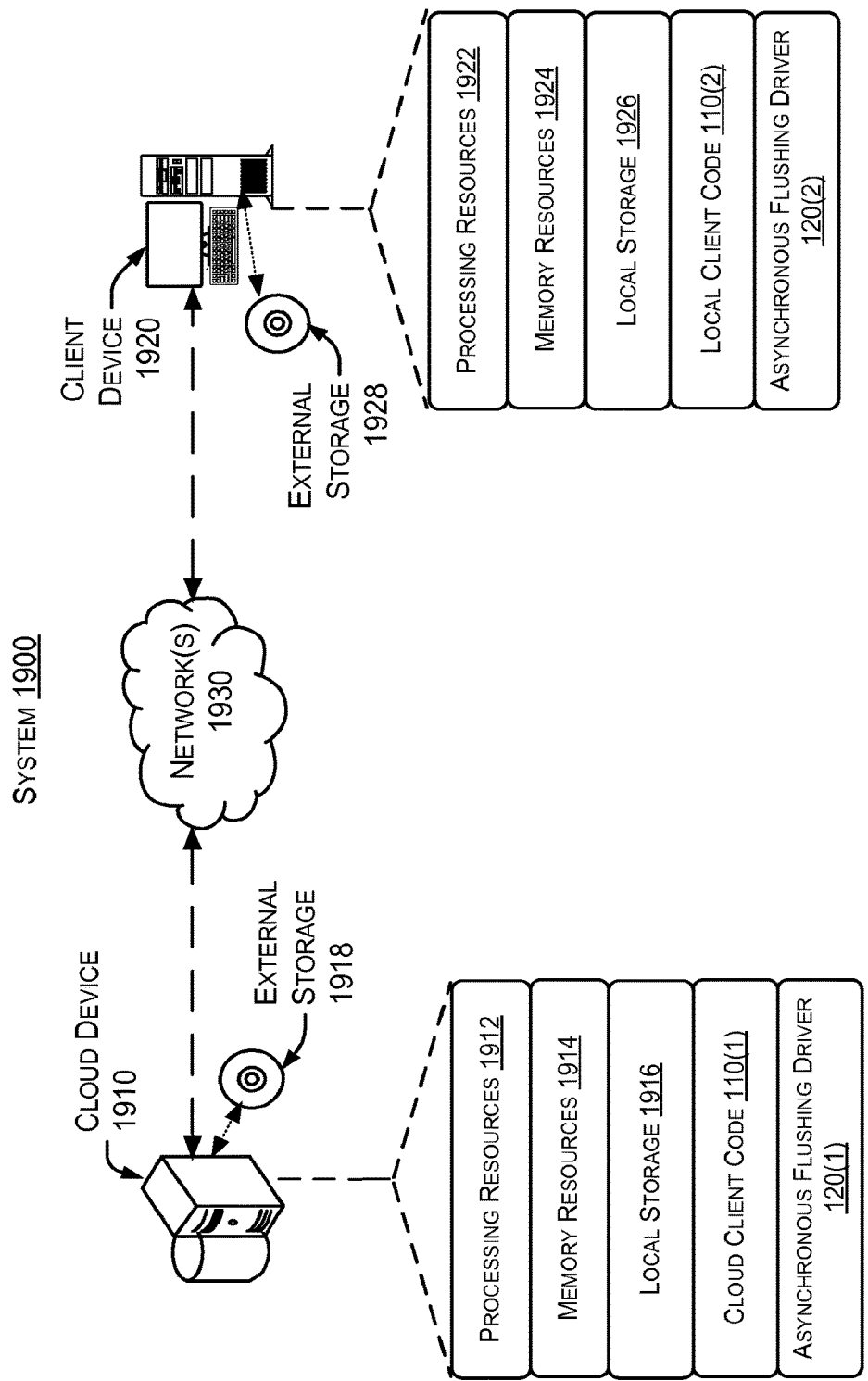
FIG. 19 illustrates an exemplary system consistent with some implementations of the present concepts.

FIG. 19 illustrates an example system in which the described techniques may be implemented in accordance with some embodiments. In this example, a system 1900 includes multiple computing devices, represented here as cloud device 1910 and client device 1920. These computing devices can function in a stand-alone or cooperative manner to implement the described techniques. Furthermore, in this example, cloud device 1910 and client device 1920 can exchange data over one or more network(s) 1930. Additionally, cloud device 1910 and/or client device 1920 can exchange data with one or more other types of devices via network(s) 1930 (e.g., additional data stream devices via a cloud). Without limitation, network(s) 1930 can include one or more local area networks (LANs), wide area networks (WANs), the Internet, and the like.

Here, each of cloud device 1910 and/or client device 1920 can include various hardware devices including processing resources 1912 and 1922, memory resources 1914 and 1924, local storage 1916 and 1926, and external storage 1918 and 1928, respectively. The processing resources 1912 and 1922 can include one or more central processing units (CPUs) or CPU cores that execute computer-readable instructions to provide the functionality described herein. These computer-readable instructions can be persisted on any of local storage 1916, local storage 1926, external storage 1918, and external storage 1928 and read into memory resources 1914 and 1924 for processing. The local and external storage resources can include one or more of volatile or non-volatile memory devices, hard drives, optical storage devices (e.g., CDs, DVDs etc.), solid state storage devices, etc. The memory resources can include various types of volatile memory including dynamic and static random access memory (RAM).

Generally speaking, cloud device 1910 and/or client device 1920 can be implemented as "computing devices." The term "computing device" as used herein can mean any type of device or devices having some amount of processing capability. Examples of computing devices can include traditional computing devices, such as personal computers (desktop, portable laptop, etc.), cell phones, smart phones, personal digital assistants, or any of a myriad of ever-evolving or yet to be developed types of computing devices. Computing devices can have various input mechanisms such as keyboards, mice, touchpads, voice recognition, etc. Computing devices can also have various output mechanisms such as printers, monitors, etc.

In some cases, the cloud device 1910 executes certain code on behalf of the client device 1920. For example, the client device can provide cloud client code 110(1) to the cloud device, which can execute the cloud client code 110(1) on behalf of the client device. The client device can execute local client code 110(2) locally on the client device to interact with and/or control the cloud client code 110(1). In some cases, the cloud client code 110(1) operates within a virtual machine on the cloud device 1910, and the asynchronous flushing driver 120(1) or similar functionality can be included in the virtual machine. In other cases, the asynchronous flushing driver 120(1) or similar functionality is not included in the virtual machine and may provide services to multiple different virtual machines on the cloud device 1910, e.g., as part of a virtual machine monitor. In further implementations, the asynchronous flushing driver 120(1) or similar functionality is included in cloud client code 110(1), e.g., the client device 1920 provides application code with asynchronous flushing functionality included therein. Note also that the client device 1920 may have its own asynchronous flushing driver 120(2) located thereon which may perform analogous operations locally on the client device 1920.

While the aforementioned discussion discussed the disclosed implementations in the context of a storage device driver, note that other implementations are also suitable. For example, the functionality discussed herein with respect to the asynchronous flushing driver 120 can be performed by firmware and/or software locally on a particular physical storage device. For example, a single hard drive, solid state drive, or optical drive may be provided with firmware that controls the drive to perform the techniques discussed herein. As another example, the techniques discussed herein may be performed by firmware or software of a control device that controls multiple storage devices such as a RAID controller (redundant array of multiple independent disks). Furthermore, the disclosed techniques can also be performed directly in hardware, e.g., using large-scale integration techniques to create an application specific integrated circuit (ASIC) or field programmable gate array (FPGA) that performs the disclosed techniques.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A system comprising:
one or more physical storage devices;
one or more hardware processing resources; and
computer-readable instructions that, when executed by the one or more hardware processing resources, cause the one or more hardware processing resources to:
receive multiple logical write commands having corresponding write data;
receive multiple flush commands, the flush commands defining corresponding flush epochs; and
issue the write data to a persistent log on the one or more physical storage devices via corresponding device write commands, wherein the write data is arranged on the persistent log in flush epoch order.

2. The system of claim 1, wherein the computer-readable instructions cause the one or more hardware processing resources to:
return from an individual flush command defining an individual flush epoch before at least some write data of the individual flush epoch is acknowledged as having been persisted by the one or more physical storage devices.

3. The system of claim 1, wherein the computer-readable instructions cause the one or more hardware processing resources to:
issue the write data to the one or more physical storage devices as expanded blocks of data having recovery information included therein.

4. The system of claim 3, wherein the computer-readable instructions cause the one or more hardware processing resources to:
periodically write checkpoint data to the one or more physical storage devices and use the checkpoint data and the recovery information of the expanded blocks to recover to a consistent prefix.

5. The system of claim 3, wherein the recovery information of the expanded blocks includes virtual block identifiers, epoch numbers, and error correction codes.

6. The system of claim 1, wherein the corresponding device write commands issue the write data to consecutive locations of the persistent log or to permuted locations of the persistent log.

7. The system of claim 6, wherein two consecutive locations of the persistent log are located on different physical storage devices.

8. A method performed by a computing device, the method comprising:

upon restarting after a crash, accessing a persistent log of write data, wherein the write data is arranged in the persistent log in flush epoch order; and
rolling forward through the persistent log while inspecting consistency data in the persistent log until the consistency data indicates that at least one consistency criteria cannot be met.

9. The method of claim 8, wherein the at least one consistency criteria provides for prefix consistency of the persistent log.

10. The method of claim 8, wherein the consistency data identifies flush epochs.

11. The method of claim 8, further comprising:
identifying a stopping condition indicating that the consistency criteria cannot be met; and
responsive to identifying the stopping condition, ceasing the rolling forward.

12. The method of claim 11, further comprising:
prior to identifying the stopping condition, recovering at least some of the write data in the persistent log by updating one or more data structures that map virtual block identifiers to corresponding locations of the at least some write data that is recovered.

13. The method of claim 12, further comprising:
retrieving checkpoint data identifying a checkpoint block where the rolling forward begins and a corresponding checkpoint epoch; and
rolling forward through a subsequent flush epoch after the checkpoint epoch and recovering all writes from the subsequent flush epoch.

14. A method comprising:
receiving multiple logical write commands having corresponding write data;
receiving multiple flush commands, the flush commands defining corresponding flush epochs;
issuing the write data to a persistent log on one or more physical storage devices via corresponding device write commands, wherein the write data is arranged on the persistent log in flush epoch order;
upon restarting after a crash:
accessing the persistent log; and
rolling forward through the persistent log while inspecting consistency data in the persistent log until the consistency data indicates that at least one consistency criteria cannot be met.

15. The method of claim 14, further comprising:
receiving the multiple flush commands from client code; and
returning to the client code without blocking after receiving the multiple flush commands.

16. The method of claim 15, further comprising:
issuing respective instances of write data to the persistent log immediately upon receiving corresponding write commands.

17. The method of claim 14, wherein the rolling forward comprises:
recovering a virtual storage device to a consistent state.

18. The method of claim 17, the consistent state being a prefix consistent state.

19. The method of claim 17, further comprising:
maintaining, in the persistent log, mappings of virtual storage locations on the virtual storage device to physical storage locations on the one or more physical storage devices.

20. The method of claim 19, the virtual storage locations being identified by the multiple logical write commands.

* * * * *